United States Patent
Benameur et al.

(10) Patent No.: US 11,578,005 B2
(45) Date of Patent: Feb. 14, 2023

(54) DENSE SINTERED PRODUCT

(71) Applicant: SAINT-GOBAIN CENTRE DE RECHERCHES ET D'ETUDES EUROPEEN, Courbevoie (FR)

(72) Inventors: Nassira Benameur, Jonquières (FR); Christian His, Cavaillon (FR); Jérôme Leloup, Le Thor (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 16/481,236

(22) PCT Filed: Jan. 30, 2018

(86) PCT No.: PCT/EP2018/052248
§ 371 (c)(1),
(2) Date: Jul. 26, 2019

(87) PCT Pub. No.: WO2018/141736
PCT Pub. Date: Aug. 9, 2018

(65) Prior Publication Data
US 2019/0367416 A1    Dec. 5, 2019

(30) Foreign Application Priority Data
Jan. 31, 2017    (FR) ...................................... 1750809

(51) Int. Cl.
*C04B 35/645* (2006.01)
*B28B 1/00* (2006.01)
(Continued)

(52) U.S. Cl.
CPC ............ *C04B 35/645* (2013.01); *B28B 1/007* (2013.01); *B28B 17/026* (2013.01);
(Continued)

(58) Field of Classification Search
CPC ........... C04B 35/119; C04B 2235/3206; C04B 2235/3208; C04B 2235/3246;
(Continued)

(56) References Cited

U.S. PATENT DOCUMENTS 4,996,177 A      2/1991   Takagi et al.
2015/0329431 A1* 11/2015  Deville ................... C04B 35/52
                                                          428/188
2017/0129816 A1* 5/2017   Deville ............... C04B 35/6263

FOREIGN PATENT DOCUMENTS

FR      2999194 A1   6/2014
FR      3028510 A1   5/2016
(Continued)

OTHER PUBLICATIONS

International Search Report corresponding International application PCT/EP2018/052248 dated Jun. 1, 2018, 4 pages.

*Primary Examiner* — Noah S Wiese
(74) *Attorney, Agent, or Firm* — Ronald M. Kachmarik; Cooper Legal Group LLC

(57) ABSTRACT

Sintered product having a relative density of greater than 90%, with, to more than 80% of the volume thereof, a stack of flat ceramic platelets, the assembly of the platelets having a mean thickness of less than 3 μm, having a width of greater than 50 mm, and including more than 20% of alumina, as a percentage on the basis of the weight of the product. The width of the product is the largest dimension measured in the plane in which the length of the product is measured, along a direction perpendicular to the direction of the length. The length of the product is the largest dimension thereof in a plane parallel to the general plane in which the platelets extend.

38 Claims, 3 Drawing Sheets

(51) Int. Cl.
  *B28B 17/02*    (2006.01)
  *C04B 35/119*   (2006.01)
  *C04B 35/626*   (2006.01)

(52) U.S. Cl.
  CPC ........ *C04B 35/119* (2013.01); *C04B 35/6263* (2013.01); *C04B 35/62655* (2013.01); C04B 2235/3206 (2013.01); C04B 2235/3208 (2013.01); C04B 2235/3246 (2013.01); C04B 2235/3418 (2013.01); C04B 2235/386 (2013.01); C04B 2235/5292 (2013.01); C04B 2235/5296 (2013.01); C04B 2235/5409 (2013.01); C04B 2235/5445 (2013.01); C04B 2235/5472 (2013.01); C04B 2235/604 (2013.01); C04B 2235/6021 (2013.01); C04B 2235/6022 (2013.01); C04B 2235/788 (2013.01); C04B 2235/94 (2013.01); C04B 2235/95 (2013.01); C04B 2235/96 (2013.01)

(58) Field of Classification Search
  CPC ...... C04B 2235/3418; C04B 2235/386; C04B 2235/5292; C04B 2235/5296; C04B 2235/5445; C04B 2235/788; C04B 2235/94; C04B 2235/95; C04B 2235/96
  See application file for complete search history.

(56) References Cited

FOREIGN PATENT DOCUMENTS

| | | |
|---|---|---|
| WO | 2014087382 A1 | 6/2014 |
| WO | 2015189659 A1 | 12/2015 |

\* cited by examiner

DENSE SINTERED PRODUCT

TECHNICAL FIELD

The invention relates to a process for manufacturing a dense sintered product of great width. The invention also relates to such a product.

PRIOR ART

WO2015189659 describes a process for manufacturing a dense product, obtained by a process comprising a step of oriented freezing of a slip comprising ceramic platelets, then a step of compression. More specifically, the freezing results from the presence of two temperature gradients F and F' (see FIG. 2) oriented perpendicular to the surface of a layer of slip B, poured onto a horizontal surface. This progression orients the platelets P parallel to one another and substantially perpendicular to the horizontal surface. The removal of the ice crystals results in a macroporous preform M. This preform is then compressed along a direction perpendicular to the general plane of the platelets before being sintered. This sintered product obtained is dense and has good mechanical properties, in particular a good toughness. Its smallest dimension, i.e. its thickness e', is conventionally measured along the compression direction.

However, the process used in WO2015189659 does not make it possible to obtain products having a width of greater than 50 mm Specifically, the freezing requires that the layer of slip extending over the horizontal plane be fine, and in particular less than 50 mm. The compression is therefore carried out in a direction parallel to the general plane of this layer. The width of the resulting product, measured (like the length) in a plane parallel to the plane of the platelets, is therefore substantially equal to the thickness of the layer of slip and is therefore limited. The dimension 1' represented in FIG. 2 makes it possible to illustrate this problem.

There is a need for a sintered product that does not exhibit brittle behavior, i.e. such that the toughness $K_{jc}$ is greater than the toughness $K_{1c}$, said toughnesses being determined by the SENB (Single-Edge Notched Beam) method, preferably with a toughness similar to, or even greater than, that of the products from WO2015189659, but having a width of greater than 50 mm.

One objective of the invention is to at least partially satisfy this need.

SUMMARY OF THE INVENTION

The invention relates to a process for manufacturing a sintered product, said process comprising the following steps:
a) preparing a slip comprising an assembly of ceramic particles suspended in a liquid phase, the assembly of the ceramic particles representing more than 90% of the volume of the suspended particles and comprising:
  a first particulate fraction consisting of platelets having a length of greater than or equal to 1 μm and, preferably less than 70 μm, the first particulate fraction having a median length $L1_{50}$ and representing more than 80% of the ceramic particles, as percentage by volume on the basis of the assembly of the ceramic particles, more than 50% by volume of said platelets each comprising more than 50% by weight of alumina; and
  a second particulate fraction of particles having a length of less than 1 μm, the second particulate fraction having a median length $D_{50}$ at least 10 times less than $L1_{50}$ (i.e. $D_{50}<L1_{50}/10$) and representing more than 1% of the ceramic particles, as percentage by volume on the basis of the assembly of the ceramic particles, the particles of said second particulate fraction being constituted, to more than 90% by weight, of oxides;
b) optionally, removing air bubbles contained in the slip,
c) freezing the slip so as to form a frozen slip incorporating ice crystals;
d) removing the ice crystals, preferably by freeze-drying, so as to obtain an intermediate product, and optionally drying of said intermediate product;
e) if the intermediate product is not in the form of a powder, the particles of which pass through the square meshes of a screen with sides of 25 mm, milling and/or screening of said intermediate product so that the intermediate product is in the form of such a powder;
f) optionally, debinding said intermediate product;
g) optionally, thermal pretreatment;
h) shaping of the intermediate product by pressing, by injection molding or by extrusion so as to obtain a preform;
i) sintering the preform with application of a pressure of greater than 0.5 MPa so as to obtain a sintered product, it being possible for the steps h) and i) to be carried out in a single unique step;
j) optionally, machining of said sintered product.

As will be seen in more detail in the rest of the description, the inventors discovered that a process according to the invention makes it possible in particular to manufacture a particularly dense sintered product, having non-brittle behavior in the SENB method and of which all the dimensions, and in particular the width, may be large.

In particular, at the end of step e), a powder is obtained of particles consisting of pieces of the intermediate product and therefore mainly consisting of agglomerated platelets. Surprisingly, even if the platelets have no favored orientation, the inventors discovered that sintering with application of a pressure of greater than 0.5 MPa is sufficient, if it is preceded by freezing/defrosting steps, to orient these platelets so that, in the sintered product, they are substantially parallel to one another. Contrary to the teaching of WO 2015 189659, it is not therefore necessary to keep all the platelets parallel to one another from the freezing step to the pressing step. Moreover, even if the platelets are oriented, it is no longer necessary to impose a pressing direction. Finally, it is no longer necessary to impose that this frozen slip be in the form of a thin layer.

The length, the width and the thickness of the sintered product may advantageously have any value, and in particular be greater than 50 mm or greater than 80 mm.

A process according to the invention may further comprise one or more of the following optional features, which may be combined in all possible combinations:
  the first and second particulate fractions are selected so that the sintered product obtained at the end of step i) is in accordance with the invention,
  in step h), the shaping of the intermediate product is carried out by pressing at a pressure greater than 3 MPa,
  in step a), the suspended particles represent more than 1% and less than 45% of the volume of the slip,
  in step a), the ceramic particles represent more than 95% of the volume of the suspended particles, in step a), more than 95% by volume of the platelets of the first particulate fraction comprise more than 98% by weight of alumina, in step a), more than 99% by volume of the platelets of the first particulate fraction comprise more than 99% by weight of alumina, in step a), more than 80% by volume of the platelets of the first particulate fraction have a length of less than 70 µm, the pressure applied during step i) is greater than 20 MPa, preferably greater than 40 MPa and less than 150 MPa, preferably less than 100 MPa, the steps h) and i) are carried out within one and the same step, preferably by using an SPS process, in step d), the removal of the ice crystals is obtained by freeze-drying, the second particulate fraction represents more than 3% and less than 10% of the ceramic particles, as a percentage by volume on the basis of the assembly of the ceramic particles, more than 90% by number of the particles of the second particulate fraction have a length at least 15 times less than $L1_{50}$, preferably at least 25 times less than $L1_{50}$, the second particulate fraction consists, to more than 80% by volume, of alumina particles, and/or of zirconia particles, and/or of stabilized zirconia particles, and/or of alumina-zirconia particles, the second particulate fraction comprises glass particles and/or glass-ceramic particles, the total amount of glass particles and glass-ceramic particles being greater than 0.5%, preferably greater than 1% and less than 18%, preferably less than 5%, as a percentage by volume on the basis of the assembly of the ceramic particles of the slip, the glass particles are selected from the group consisting of glasses containing silica, glasses containing boron oxide, and mixtures thereof, preferably selected from the group of glasses comprising, preferably consisting of to more than 90% by weight
  $SiO_2$ on the one hand, and CaO and/or MgO and/or $Na_2O$ and/or $TiO_2$ and/or $K_2O$ and/or $Al_2O_3$ on the other hand, the silica content being greater than 10% by weight, preferably greater than 80% by weight, preferably the $SiO_2$/CaO molar ratio is between 2 and 4, or
  $B_2O_3$ on the one hand, and CaO and/or $Na_2O$ and/or $TiO_2$ and/or $K_2O$ and/or $Al_2O_3$ on the other hand, the boron content being greater than 10% by weight, preferably greater than 80% by weight, the second particulate fraction consists of, to more than 80% by volume, alumina particles and/or zirconia particles and/or stabilized zirconia particles and/or alumina-zirconia particles and/or glass particles consisting of, to more than 90% by weight, $SiO_2$ on the one hand, and CaO and/or MgO and/or $Na_2O$ and/or $TiO_2$ and/or $K_2O$ and/or $Al_2O_3$ on the other hand, the ratio of the amount by volume of particles which are neither glass particles, nor glass-ceramic particles to the total amount of glass particles and glass-ceramic particles is greater than 0.5, preferably greater than 1 and less than 4, preferably less than 2.5, in the second particulate fraction, the median length of the glass particles and/or of the glass-ceramic particles of the second particulate fraction $D_{50v}$ is at least 2 times less, preferably at least 5 times less than the median length of the particles which are not glass particles.

The invention also relates to a sintered product
  having a relative density of greater than 90%, preferably a crack initiation toughness $K_{1c}$ of greater than 3.5 MPa·m$^{1/2}$, and preferably a toughness $K_{jc}$ of greater than 6 MPa·m$^{1/2}$,
  consisting of, to more than 80% of the volume thereof, a stack of ceramic platelets, the assembly of the platelets having a mean thickness of less than 3 µm,
  having a width of greater than 50 mm, and
  having a chemical analysis such that the alumina content is greater than 20% on the basis of the weight of the product, the thickness (W1) of a platelet being the length of the minor axis of the ellipse (E) of minimal area within which the median cross section of said platelet can be inscribed, said median cross section being a section in a cutting plane (A) perpendicular to the direction of the length (L1) of said platelet and cutting said platelet at mid-length, said length being the largest dimension of said platelet observable on an image taken along a direction perpendicular to the plane on which said platelet rests, flat, the width (l) of the product being the largest dimension measured in the plane (C) in which the length of the product is measured, along a direction perpendicular to the direction of said length, the length (L) of said product being the largest dimension thereof in a plane (C) parallel to the general plane in which the platelets extend.

Preferably, the product according to the invention also has one or more of the following optional features:
  a crack initiation toughness $K_{1c}$ of greater than 3.5 MPa·m$^{1/2}$, preferably greater than 5 MPa·m$^{1/2}$,
  a toughness $K_{jc}$ of greater than 6 MPa·m$^{1/2}$, preferably greater than 8 MPa·m$^{1/2}$,
  a relative density of greater than 95%, preferably greater than 98%,
  a mean platelet thickness of less than 2.0 µm, preferably less than 1.5 µm,
  a width of greater than 60 mm, preferably greater than 85 mm,
  more than 70%, preferably more than 95%, by number of the platelets of the sintered product comprise more than 70%, preferably more than 95%, by weight of alumina,
  a boron nitride content of greater than 1% and less than 20% by weight on the basis of the weight of said product, the boron nitride being present in the form of platelets,
  more than 90% by number of the platelets of said product have a length of less than 70 µm and greater than 2 µm,
  a chemical analysis such that, as percentages by weight:
    the content of $SiO_2$ is greater than 0.2% and less than 13.5%, preferably less than 2%, preferably less than 1.5%, and
    the content of CaO+MgO is greater than 0.1% and less than 4.5%, preferably less than 1.5%, preferably less than 0.8%, and
    the alumina and the other elements constituting the balance to 100%, the content of other elements being less than 2%, preferably less than 1.5%, preferably less than 0.8%,
    preferably the content of $Al_2O_3$ is greater than 95%, preferably greater than 96.9% and less than 99.7%, preferably less than 99.5%.
  or such that
    the content of $SiO_2$ is greater than 0.2% and less than 13.5%, preferably less than 2%, preferably less than 1.5%, and the content of CaO is greater than 0.1% and less than 4.5%, preferably less than 1.5%, preferably less than 0.8%, and the content of MgO is less than 0.3%, preferably less than 0.1%, and the alumina and the other elements constituting the balance to 100%, the content of other elements being less than 2%, preferably less than 1.5%, preferably less than 0.8%, preferably the content of $Al_2O_3$ is greater than 95%, preferably greater than 96.8% and less than 99.7%, preferably less than 99.5%.

or such that the content of $SiO_2$ is greater than 0.2% and less than 13.5%, preferably less than 2%, preferably less than 1.5%, and the content of MgO is greater than 0.1% and less than 4.5%, preferably less than 1.5%, preferably less than 0.8%, and the content of CaO is less than 0.3%, preferably less than 0.1%, and the alumina and the other elements constituting the balance to 100%, the content of other elements being less than 2%, preferably less than 1.5%, preferably less than 0.8%, preferably the content of $Al_2O_3$ is greater than 95%, preferably greater than 96.8% and less than 99.7%, preferably less than 99.5%.

or such that the content of optionally stabilized $ZrO_2$ is greater than 1% and less than 15%, and the content of $SiO_2$ is greater than 0.2% and less than 13.5%, preferably less than 2%, preferably less than 1.5%, and the content of CaO+MgO is greater than 0.1% and less than 4.5%, preferably less than 1.5%, preferably less than 0.8%, and the alumina and the other elements constituting the balance to 100%, the content of other elements being less than 10%, preferably less than 1.5%, preferably less than 0.8%, or such that the content of $SiO_2$ is greater than 0.2% and less than 13.5%, preferably less than 2%, preferably less than 1.5%, and the content of CaO+MgO is greater than 0.1% and less than 4.5%, preferably less than 1.5%, preferably less than 0.8%, and the content of boron nitride is greater than 1% and less than 20%, and the alumina and the other elements constituting the balance to 100%, the content of other elements being less than 10%, preferably less than 1.5%, preferably less than 0.8%, or such that the content of optionally stabilized $ZrO_2$ is greater than 1% and less than 15%, and the content of $SiO_2$ is greater than 0.2% and less than 13.5%, preferably less than 2%, preferably less than 1.5%, and the content of CaO+MgO is greater than 0.1% and less than 4.5%, preferably less than 1.5%, preferably less than 0.8%, and the content of boron nitride is greater than 1% and less than 20%, and the alumina and the other elements constituting the balance to 100%, the content of other elements being less than 10%, preferably less than 1.5%, preferably less than 0.8%, The invention also relates to a sintered product obtained or capable of having been obtained by a process according to the invention.

The invention also relates to a device selected from a turbine, in particular for propulsion or for energy generation, a sensor other than a displacement sensor, in particular for a gas or liquid, a probe, in particular for a gas or liquid, a membrane for the filtration of gases or liquids, an armor or armoring element, a shield or shielding element, a wear-resistant part or coating, an element of the infrastructure of a kiln, in particular a beam or an edge, a thick or thin layered substrate for electronic components or insulators for electrical conductors, a tool, in particular a chisel, a knife, a sharpener, a drill bit, a drill, a screwdriver, a file, a grinding wheel, grains for deburring or treating a surface, a shaping tool, in particular a die, an injection mold, a firing support, in particular of a furnace for firing ceramics, a prosthesis, in particular a dental implant, an orthopedic element, said device comprising a product according to the invention or obtained by a process according to the invention or capable of having been obtained by a process according to the invention.

Definitions

"Ceramic material" means any nonmetallic and inorganic material.

"Precursor" of an element means an object that is transformed into said element by the execution of a process according to the invention.

"Sublimation" means an operation, generally under vacuum, which consists in evaporating ice without melting it.

"Melting" is an operation that consists of melting ice.

"Temporary" means "removed from the product during the debinding or sintering".

"Particles" are the solid elements constituting a powder or suspended in a slip. In a sol, the dissolved matter therefore does not constitute particles. The structure of a gel, obtained by gelling of a sol, comprises hardly any particles. In the sintered product, by extension, "particles" also means the particles agglomerated during the sintering and which were suspended in the slip used for manufacturing the sintered product. The dimensional characteristics relating to a platelet within the sintered product may be evaluated by measurements on said product.

The "length" L1 of a platelet is the largest dimension thereof observable on an image taken along a direction perpendicular to the plane on which said platelet rests, flat.

The "width" W2 and the "thickness" W1 of a platelet are the lengths of the major and minor axes, respectively, of the smallest possible ellipse (i.e. of minimal area) E in which the median cross section of said platelet can be inscribed (i.e. in the cutting plane A in FIG. 1).

FIG. 1 represents a diagram of a platelet 10. In FIG. 1a, the platelet 10 is represented in perspective. FIG. 1b represents the section of the platelet 10 along the median transverse plane A (plane perpendicular to the direction of the length L1, passing through the mid-length of the platelet).

A particle has a "platelet" shape when it satisfies the following two conditions:
1) 4≤L1/W1, and
2) W2≥1.5 W1, preferably W2≥2 W1, preferably W2≥3 W1, preferably W2≥4 W1, preferably W2≥5 W1, preferably W2≥7 W1, preferably W2≥9 W1.

Preferably, the cross section of a platelet is substantially polygonal and comprises at least 4 sides. More preferably, the major faces of a platelet are substantially flat, and preferably parallel to one another.

The dimensions of a platelet may be easily evaluated on images of observations made on a powder.

It is also possible to estimate the dimensions of the platelets from observations of surfaces obtained by fracture of the product, in planes containing the major faces of said platelets and in planes perpendicular to said major faces.

The "median" value of a property of the particles of an ensemble of particles is the value of this property that divides the particles of said ensemble into first and second populations that are equal in number, these first and second populations only comprising particles having a value of said property greater than or equal to, or less than respectively, the median value. For example, the median length of an ensemble of particles is the length dividing the particles into first and second populations equal in number, these first and second populations only comprising particles having a length greater than or equal to, or less than respectively, the median length The length L of a sintered product according to the invention (FIG. 4) is the largest dimension thereof in a plane C parallel to the general plane in which the platelets extend. When the product is of cylindrical shape, as in FIG. 4, the plane C may be any plane parallel to the general plane in which the platelets extend. Otherwise, as in FIG. 5, the plane C is selected, among all the planes parallel to the general plane in which the platelets extend, as the plane in which the product has the largest dimension.

The width l of a sintered product according to the invention is the largest dimension measured in the plane C in which the length is measured, along a direction perpendicular to the direction of the length.

"Stabilized zirconia" is a zirconia having an amount of zirconia in a monoclinic crystallographic form of less than 5% by weight, the balance consisting of zirconia in a stable and/or metastable quadratic, and/or cubic, crystallographic form.

By definition, a "bimodal" distribution reveals two categories that are not contiguous having the highest values, called "main peaks" or "main modes".

Unless otherwise stated, a mean is an arithmetic mean.

Unless otherwise stated, all the percentages relating to the composition of a slip according to the invention are percentages by volume relative to the volume of the slip.

The percentages by volume of an assembly of particles correspond to percentages considering the sum of the volumes of each of the particles considered. The sum of these volumes is calculated conventionally by the ratio of the weight of said assembly of particles divided by the absolute density of the material of said particles. For example, if the second particulate fraction represents less than 20% "of the volume of the ensemble of ceramic particles", or in an equivalent manner "of the volume of the ceramic particles" or "as a percentage by volume based on the assembly of the ceramic particles" or "as a percentage by volume based on the ceramic particles", the volumes to be compared are the volume of the particles of the powder constituting the second particulate fraction and the volume of the assembly of the ceramic particles.

The "relative density of a product" is equal to the ratio of the bulk density of the product divided by the absolute density of the product, expressed as a percentage.

The "bulk density of a product" is understood for the purposes of the present invention to mean the ratio equal to the weight of the product divided by the volume occupied by said product. It can be measured by imbibition, according to the principle of hydrostatic buoyancy.

The "absolute density of a product" is understood for the purposes of the present invention to mean the ratio equal to the weight of dry matter of said product after grinding to a fineness such that hardly any closed porosity remains, divided by the volume of said weight of dry matter after grinding. It may be measured by helium pycnometry.

A stack of platelets is a structure in which the platelets are superposed flat on one another, with a possible lateral offset, as represented, for example, in FIG. 2c.

The concept of "pigment" is well known to a person skilled in the art. A pigment is a powder which, when it is incorporated into a preform, imparts a particular color to the sintered product. The coloration may in particular result from the sintering of said preform. Conventionally, a pigment is a powder, the median particle size of which is less than 50 µm.

The various features of a product according to the invention may be determined by the characterization methods used for the examples below.

BRIEF DESCRIPTION OF THE FIGURES

Other features and advantages of the invention will become clearer on examining the drawing, provided by way of nonlimiting illustration, in which.

Figure 1A:
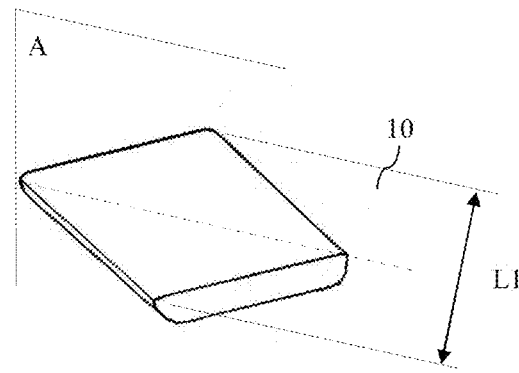
FIG. 1 (1a-1b) schematically represents a platelet.
Figure 1B:
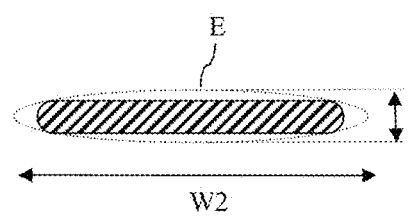
Figure 2A:
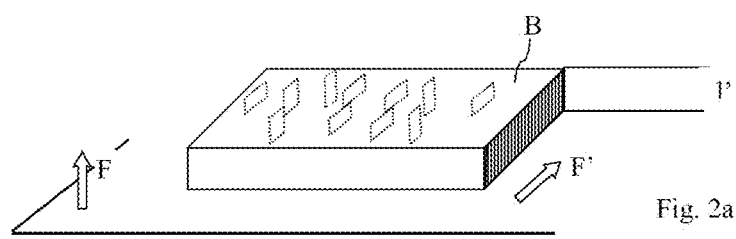
FIG. 2 (2a-2c) illustrates a process according to the prior art.
Figure 2B:
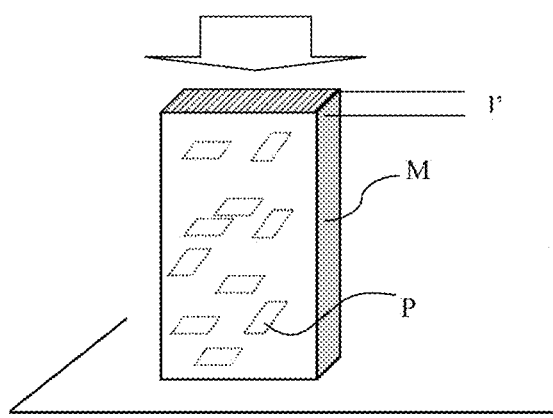
Figure 2C:
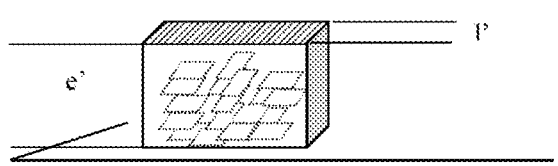
Figure 3:
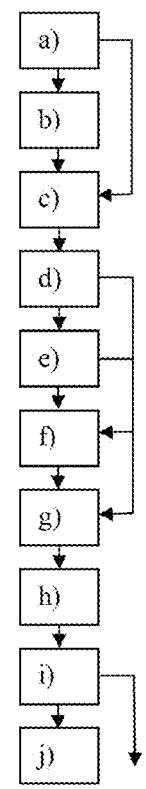
FIG. 3 illustrates a process according to the invention.
Figure 4:
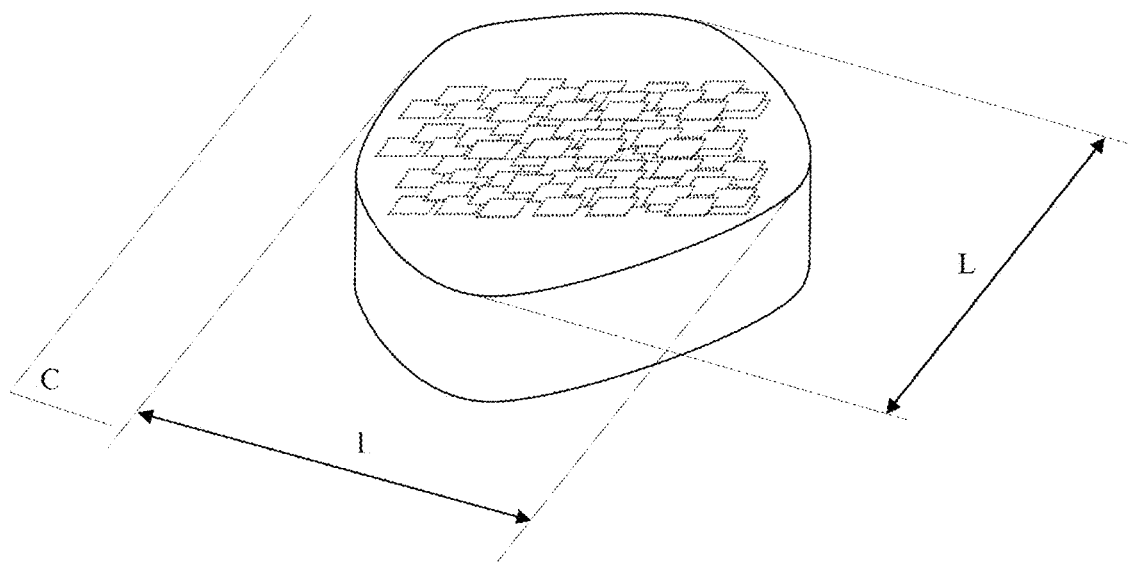
FIGS. 4 and 5 represent, in perspective, sintered products according to the invention.
Figure 5:
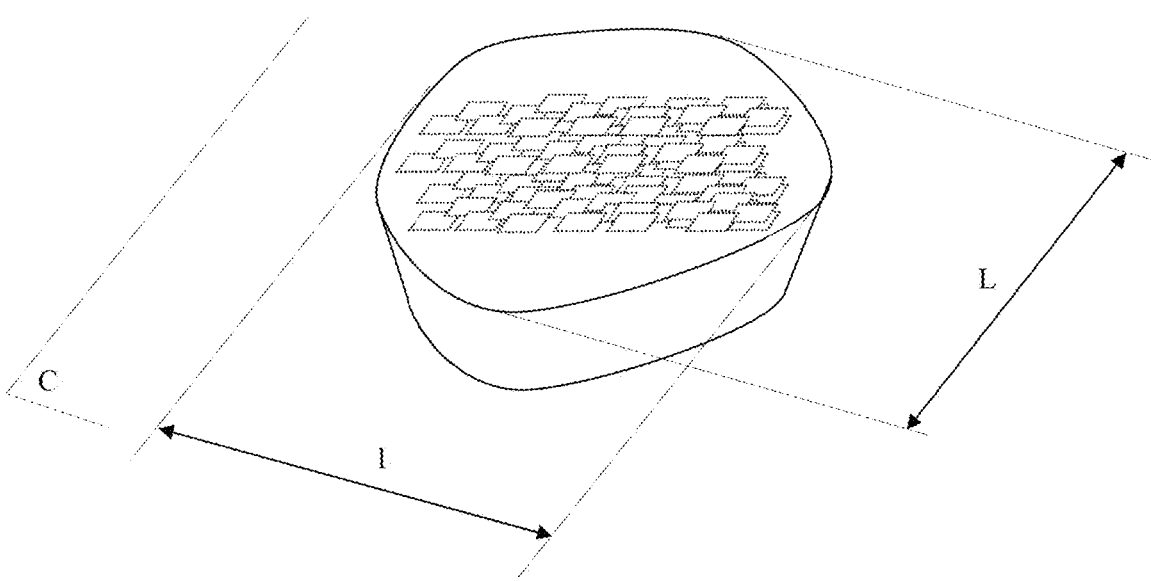

In the figures, identical references have been used to denote identical or similar objects.

DETAILED DESCRIPTION

Process According to the Invention
A product according to the invention may be manufactured by a process comprising steps a) to j) above.
In step a) of preparing the slip, a suspension of ceramic particles is prepared.

The suspended particles represent preferably more than 1%, preferably more than 2%, preferably more than 5%, preferably more than 8% and less than 45%, preferably less than 40%, preferably less than 35%, preferably less than 30%, preferably less than 25%, preferably less than 20% of the volume of the slip.

The ceramic particles represent preferably more than 95%, or even more than 99%, or even substantially 100% of the volume of the suspended particles.

The ceramic particles may be replaced, partially or completely, by equivalent amounts of precursors that are converted into ceramic particles before step j).

Preferably, the first and second particulate fractions together represent more than 85%, preferably more than 90%, preferably more than 95% of the assembly of the ceramic particles, as a percentage by volume. In one embodiment, the first and second particulate fractions together represent more than 98%, preferably more than 99%, preferably substantially 100% of the assembly of the ceramic particles, as a percentage by volume.

The particle size distribution of the ceramic particles of the suspension is preferably bimodal, the two main modes corresponding to the first and second particulate fractions, respectively.

In one embodiment, the assembly of the ceramic particles in suspension comprises a pigment.

Any pigment known from the prior art may be used, a person skilled in the art knowing how to determine the nature of the pigment and the amount thereof so as to obtain a sintered product according to the invention that has the desired color. $Co_3O_4$ may for example be added so as to obtain a sintered product of blue color.

Preferably, the pigment is an oxide. Preferably, the pigment is an oxide comprising the element aluminum or a compound that forms, during the sintering step i), an oxide comprising the element aluminum.

Preferably, the amount of pigment is greater than 1%, preferably greater than 2%, preferably greater than 4% and less than 15%, preferably less than 13% of the assembly of the ceramic particles, as a percentage by volume.

In one embodiment, the pigment may be partially or completely included in the second particulate fraction.

First Particulate Fraction

The first particulate fraction, or "platelet fraction", represents preferably more than 85%, preferably more than 88%, preferably more than 90%, preferably more than 92%, preferably more than 94% of the assembly of the ceramic particles, as a percentage by volume.

In one preferred embodiment, more than 50%, preferably more than 55%, preferably more than 60%, preferably more than 65%, preferably more than 70%, preferably more than 75%, preferably more than 80%, preferably more than 85%, preferably more than 90%, preferably more than 95%, preferably more than 99% by volume of the platelets of the first particulate fraction comprise more than 50%, preferably more than 60%, preferably more than 70%, preferably more than 80%, preferably more than 90%, preferably more than 95%, preferably more than 97%, preferably more than 98%, preferably more than 99%, by weight of alumina.

Preferably, in the platelets of the first particulate fraction, the balance to the alumina consists of, to more than 90% by weight, preferably to more than 95%, preferably to more than 97%, preferably to more than 99% by weight, oxides.

In one embodiment, the first particulate fraction comprises, to a total of more than 90%, preferably more than 95%, preferably more than 99%, more than 60% by volume, on the basis of the volume of the first particulate fraction, platelets comprising more than 50%, preferably more than 60%, preferably more than 70%, preferably more than 80%, preferably more than 90%, preferably more than 95%, preferably more than 97%, preferably more than 98%, preferably more than 99%, by weight of alumina, and less than 40% by volume of platelets comprising more than 90%, preferably more than 95% by weight of boron nitride.

Preferably, more than 90%, preferably more than 95%, preferably more than 98%, preferably more than 99%, by volume, of the platelets of the first particulate fraction, have a length of less than 70 μm, preferably less than 60 μm, preferably less than 50 μm, preferably less than 40 μm, preferably less than 25 μm, preferably less than 20 μm, or even less than 15 μm and preferably of greater than 2 μm, preferably greater than 4 μm, preferably greater than 5 μm.

Preferably, more than 90%, preferably more than 95%, preferably more than 98%, preferably more than 99%, by volume, of the platelets of the first particulate fraction have a width less than or equal to 20 μm, preferably less than 15 μm, preferably less than 10 μm, and preferably greater than 2 μm, preferably greater than 3 μm, preferably greater than 4 μm.

Preferably, more than 90%, preferably more than 95%, preferably more than 98%, preferably more than 99%, by volume, of the platelets of the first particulate fraction have a thickness less than or equal to 3 μm, preferably less than or equal to 2.5 μm, preferably less than or equal to 2 μm, preferably less than or equal to 1.5 μm, or even less than or equal to 1 μm.

In one embodiment, more than 90%, preferably more than 95%, preferably more than 98%, preferably more than 99%, by volume, of the platelets of the first particulate fraction, have a length of less than 10 μm, preferably less than 8 μm, preferably less than 6 μm, preferably less than 4 μm, and preferably of greater than 1 μm; and a width of less than 10 μm, preferably less than 8 μm, preferably less than 6 μm, preferably less than 4 μm, and preferably of greater than 1 μm; and a thickness less than or equal to 1.5 μm, preferably less than or equal to 1 μm, preferably less than or equal to 0.8 μm, preferably less than or equal to 0.5 μm, preferably less than or equal to 0.5 μm, preferably less than or equal to 0.3 μm, preferably less than or equal to 0.1 μm. Advantageously, the modulus of rupture is thereby improved.

Second Particulate Fraction

Remarkably, the presence of the fine particles of the second particulate fraction considerably improves the density of the sintered product.

The second particulate fraction represents preferably more than 2%, preferably more than 3%, preferably more than 4% and less than 10%, preferably less than 9%, preferably less than 8%, preferably less than 7%, preferably less than 6% of the ceramic particles, as a percentage by volume on the basis of the assembly of the ceramic particles.

In one embodiment, more than 90%, preferably more than 95%, preferably more than 98%, by number of the particles of the second particulate fraction, have a length at least 15 times, preferably at least 20 times, preferably at least 25 times, preferably at least 30 times less than $L1_{50}$.

Preferably, the particles of the second particulate fraction consist of, to more than 93%, preferably to more than 95%, preferably to more than 97%, preferably to more than 98%, preferably to more than 99%, preferably to more than 99.5%, preferably to more than 99.9%, oxides.

In one embodiment, the second particulate fraction consists of, to more than 80%, preferably more than 90%, preferably substantially 100% by volume, ceramic particles which are not glass particles, preferably alumina particles and/or zirconia particles and/or stabilized zirconia particles and/or alumina-zirconia particles, preferably alumina particles. In one embodiment, the second particulate fraction not comprise any glass and/or glass-ceramic particles.

The stabilized zirconia is preferably a zirconia stabilized with yttrium oxide, cerium oxide, calcium oxide, magnesium oxide, scandium oxide and mixtures thereof.

In one embodiment, the second particulate fraction comprises pigment particles.

In one preferred embodiment, the second particulate fraction comprises glass and/or glass-ceramic particles, preferably glass particles, preferably as a mixture with ceramic particles which are not glass particles, preferably alumina particles and/or zirconia particles and/or stabilized zirconia particles and/or alumina-zirconia particles, preferably alumina particles.

The glass particles and/or the glass-ceramic particles may be replaced, partially or completely, by equivalent amounts of particles of glass precursors and/or of glass-ceramic particles, respectively. This replacement is also applicable for all of the optional features relating to the glass particles and glass-ceramic particles described below.

Preferably, the assembly of the glass and/or glass-ceramic particles has a median length $D_{50v}$ at least 50 times less than $L1_{50}$, preferably at least 100 times less than $L1_{50}$, preferably at least 150 times less than $L1_{50}$, preferably at least 200 times less than $L1_{50}$, preferably at least 300 times less than $L1_{50}$.

In one preferred embodiment, the amount of glass particles and/or of glass-ceramic particles is greater than 0.5%, preferably greater than 1% as a percentage by volume on the basis of the assembly of the ceramic particles. More preferably, the amount of glass particles and/or of glass-ceramic particles is less than 18%, or even less than 10%, or even less than 5%, as a percentage by volume on the basis of the assembly of the ceramic particles in suspension.

Preferably, the ratio of the amount by volume of particles which are neither glass particles, nor glass-ceramic particles to the total amount by volume of glass particles and glass-ceramic particles, is greater than 0.5, preferably greater than 1 and/or less than 4, preferably less than 3, preferably less than 2.5.

More preferably, the median length $D_{50c}$ of the particles which are neither glass particles, nor glass-ceramic particles is greater than 0.5 times, preferably greater than 0.7 times, preferably greater than 0.8 times the product
- of the percentage by volume of the second particulate fraction on the basis of the assembly of the ceramic particles of the slip and
- of the mean thickness of the particles of the first particulate fraction W1*, and, preferably, less than 1.5 times, preferably 1.3, preferably 1.2 times said product.

Preferably, the median length of the glass particles and/or of the glass-ceramic particles of the second particulate fraction $D_{50v}$ is at least 2 times, preferably at least 4 times, preferably at least 5 times less than the median length of the particles which are not glass particles of the second particulate fraction.

Preferably, the glass transition temperature of the glass of said glass particles is between the start of densification temperature and the end of densification temperature, the start and end of densification temperatures being measured on a product obtained by the same process and from the same slip, but which does not comprise any glass particles. The start of densification and end of densification temperatures are measured on a dilatometer and correspond to the temperature at which shrinkage begins and to the temperature at which shrinkage ends, respectively.

Preferably, the glass particles are selected from the group consisting of glasses containing silica, glasses containing boron oxide, and mixtures thereof.

Glass Containing Silica

Preferably, the glass particles are selected from the group of glasses comprising, preferably consisting of to more than 90%, preferably to more than 95% by weight, $SiO_2$ on the one hand, and CaO and/or MgO and/or $Na_2O$ and/or $TiO_2$ and/or $K_2O$ and/or $Al_2O_3$ on the other hand, preferably $SiO_2$, and CaO and/or MgO and/or $Al_2O_3$, preferably $SiO_2$, and CaO and/or MgO.

In one embodiment, the second particulate fraction consists of, to more than 80%, preferably more than 90%, preferably substantially 100% by volume, alumina particles, and/or zirconia particles, and/or stabilized zirconia particles, and/or alumina-zirconia particles and/or glass particles consisting of, to more than 90%, preferably to more than 95% by weight, $SiO_2$ on the one hand, and CaO and/or MgO and/or $Na_2O$ and/or $TiO_2$ and/or $K_2O$ and/or $Al_2O_3$ on the other hand, preferably $SiO_2$, and CaO and/or MgO and/or $Al_2O_3$, preferably $SiO_2$, and CaO and/or MgO.

Preferably the silica content of said glass particles containing silica is greater than 10%, greater than 20%, greater than 30%, greater than 40%, greater than 50%, greater than 60%, greater than 70%, greater than 80% by weight. Preferably the glass contains $SiO_2$ on the one hand, and CaO and/or $Al_2O_3$ on the other hand. Preferably, the glass contains $SiO_2$ and CaO and $Al_2O_3$. In one embodiment, the $SiO_2/CaO$ molar ratio is between 2 and 4, preferably between 2.5 and 3.5, or even substantially equal to 3.

Glass Containing Boron Oxide

The glasses containing boron oxide may be glasses comprising $B_2O_3$ on the one hand, and CaO and/or $Na_2O$ and/or $TiO_2$ and/or $K_2O$ and/or $Al_2O_3$, on the other hand. Preferably the $B_2O_3$ content of said glasses based on boron oxide is greater than 10%, greater than 20%, greater than 30%, greater than 40%, greater than 50%, greater than 60%, greater than 70%, greater than 80% by weight.

Liquid Phase

The liquid phase preferably contains more than 50%, preferably more than 60%, preferably more than 70%, preferably more than 80%, preferably more than 90% water, preferably more than 95% water, as a percentage by volume on the basis of the liquid phase. The liquid phase may consist of water.

The amount of liquid phase is preferably greater than 50%, preferably greater than 60%, preferably greater than 70%, preferably greater than 80%, or even greater than 90%, as a percentage by volume of the slip.

The slip preferably contains a dispersant that facilitates the obtaining of a homogeneous suspension. Preferably, the dispersant content is between 0.1% and 3%, preferably between 0.2% and 2%, preferably between 0.5% and 1.5%, by weight on the basis of the weight of the ceramic particles of the slip. The dispersants conventionally used for the manufacture of sintered products by slip casting may be employed, for example ammonium polymethacrylates such as Darvan 7-NS, manufactured by the company Vanderbilt.

The slip preferably contains a thickener. Preferably the content of thickener is between 0.1% and 3%, preferably between 0.1% and 1%, by weight on the basis of the weight of the ceramic particles of the slip. Carbopol EDT 2691, sold by the company Lubrizol may for example be used as thickener.

The slip may contain a binder, preferably a temporary binder. Preferably the content of binder is between 0.5% and 5% by weight on the basis of the weight of the ceramic particles of the slip. The temporary binders conventionally used for the manufacture of sintered products may be employed, for example polyvinyl alcohol (PVA), polyethylene glycols (PEGs).

The slip may also contain an antifoaming agent. Preferably the content of antifoaming agent is between 0.1 and 3%, preferably between 0.1% and 1% by weight on the basis of the weight of the ceramic particles of the slip. The antifoaming agents conventionally used for the manufacture of sintered products by slip casting may be employed, for example Contraspum Conc sold by the company Zschimmer and Schwarz.

In one embodiment, the ceramic particles, water, optional dispersant, optional thickener, optional binder, optional antifoaming agent together represent more than 80%, more than 90%, more than 95%, more than 99%, or even substantially 100% of the volume of the slip.

Preferably the various constituents of the slip are added with stirring.

The mixing of the various constituents of the slip may be carried out by any technique known by a person skilled in the art, for example in a mixer, in a Turbula mixer, in a jar mill with balls, preferably of the same kind as the ceramic powder in suspension. The intensity of mixing and/or the mixing time are preferably adjusted so as not to break the platelets. For this purpose, the platelets are preferably introduced last in a premix containing the other constituents.

If a jar mill is used, the mixing time is preferably greater than 0.5 hour and less than 20 hours. Preferably, a jar mill is used, the platelets being introduced into a premix previously mixed for 12 hours, the mixing time starting from the introduction of the platelets into the slip being more than 30 minutes and preferably less than 4 hours.

The mixing may be facilitated by subjecting the slip to ultrasonic waves.

In step b), which is preferred, the air bubbles are removed, preferably by vacuum degassing or using ultrasonic waves.

In step c), the slip is cooled so as to solidify the water and form ice crystals.

Any technique known to a person skilled in the art that makes it possible to freeze a slip may be used, for example "ice templating" techniques of texturing the ice or "freeze granulation" techniques of freezing drops of slip, or techniques that consist in immersing an amount of slip in a cooling bath, preferably in liquid nitrogen.

Preferably, in particular when the slip is immersed in a cooling bath or in the case of oriented freezing, the freezing rate is greater than 1 μm/s, preferably greater than 5 μm/s, preferably greater than 10 μm/s, preferably greater than 12 μm/s, or even greater than 15 μm/s, or even greater than 20 μm/s, or even greater than 40 μm/s and less than 400 μm/s, preferably less than 300 μm/s, preferably less than 200 μm/s, preferably less than 100 μm/s.

In one embodiment, the freezing step is oriented along a favored direction forming a solidification front. In this mode, preferably, the thermal gradient is greater than 10° C./cm, or even 20 greater than 20° C./cm and less than 200° C./cm, or even less than 150° C./cm, or even less than 100° C./cm.

The size of the ice crystals depends mainly on the speed of displacement of the solidification front and on the thermal gradient associated with this solidification front. The higher the speed of displacement, the smaller the size of the ice crystals.

In one preferred embodiment, the slip is however frozen without favoring a freezing direction. The process is considerably simplified thereby.

Preferably, the slip is immersed in a cooling bath, preferably of liquid nitrogen, and preferably, the slip is brought back out therefrom when it is almost completely frozen.

Preferably, the whole of the slip is solidified during step c).

In step d), the solidified slip is placed under pressure and temperature conditions that lead to a removal of the ice crystals, preferably by sublimation. Advantageously, the sublimation takes place almost without any displacement of the particles positioned between the crystals. For example, it is possible to sublime the ice crystals by heating them up at very low pressure, typically at a pressure of less than 0.5 mbar, preferably less than 0.3 mbar.

It is also possible to melt the ice crystals, and let the liquid water obtained run off. Step d) is preferably continued until all the ice crystals have been removed.

An intermediate product, in the form of a block or agglomerates, is thus obtained.

The intermediate product may be dried if it is wet, the drying preferably being carried out at a temperature between 50° C. and 110° C., for a time preferably of more than 2 hours, preferably more than 10 hours.

Preferably, step d) is a step of removing the ice crystals by sublimation thereof and the process according to the invention does not therefore require such drying.

In step e), if the intermediate product is not in the form of a powder, it is milled and/or screened so as to convert it into powder.

The product is considered to not be in the form of a powder if it cannot pass through a screen of square meshes with sides of 25 mm, preferably sides of 15 mm, preferably of 10 mm, preferably of 5 mm, preferably of 4 mm, preferably of 3 mm, preferably of 2 mm The milling may be carried out dry by any technique known to a person skilled in the art, preferably using a bowl containing moving mobile bodies (rings, paddles or balls), a manual press or a pestle and mortar.

The screening is preferably carried out using a screen with an aperture of less than 1 mm, or even less than 500 μm, or even less than 400 μm. Advantageously, this step makes it possible to remove the largest agglomerates.

In step f), which is optional, the debinding makes possible to remove the organic materials. It is properly carried out using a heat treatment, preferably at a temperature between 300° C. and 500° C., preferably in air. The hold time at the maximum temperature is preferably less than or equal to 2 hours.

The thermal pretreatment step g), which is optional, makes it possible to promote the attachment of the particles of the second particulate fraction to the platelets of the first particulate fraction.

The maximum temperature reached in step g) is preferably above 600° C., preferably above 700° C., preferably above 800° C. and preferably below 1200° C.

The hold time at the maximum temperature is preferably less than 5 hours, preferably less than 2 hours. In one preferred embodiment, the hold time at the maximum temperature is substantially zero.

When the first particulate fraction contains boron nitride platelets, this step is preferably carried out in a nitrogen atmosphere.

In step h), the intermediate product in powder form is shaped by pressing, by injection molding or by extrusion so as to obtain a preform.

All injection molding techniques are possible. Preferably, in the case of shaping by injection molding, the intermediate product in powder form is conventionally mixed with a wax or with a polymer so as to obtain a compound having a rheology suitable for the injection molding.

All extrusion techniques are possible. Preferably, in the case of shaping by extrusion, the intermediate product in powder form is conventionally mixed with water and with products, preferably organic products, which favor the extrusion, in particular plasticizers and lubricants. The amount of plasticizers and lubricants may be between 1% and 5%, preferably between 1.5% and 3% by weight on the basis of the summed weight of the powder of the intermediate product, the water and said plasticizers and lubricants.

The amount of water may be between 10% and 25%, preferably between 15% and 20% by weight on the basis of the summed weight of the powder of the intermediate product, the water and said plasticizers and lubricants.

The extrusion may be carried out at atmospheric pressure or under vacuum.

In the case of shaping by injection molding or by extrusion, a drying and/or a debinding is preferably carried out after the shaping, preferably by heat treatment, the temperature of which depends on the plasticizers, lubricants, polymers and waxes used during the shaping.

Preferably, the shaping of the powder is carried out by pressing. The process is advantageously simplified thereby.

Preferably, the pressing is configured so that the sintering of the preform in step i) results in a sintered product having a relative density of greater than 90%, or even of greater than 95%.

All pressing techniques are possible. Preferably, the pressing is chosen from uniaxial pressing and cold isostatic pressing.

In the case of shaping by pressing, the intermediate product in powder form is poured into a mold, then subjected to a pressure preferably of greater than 3 MPa, preferably greater than 5 MPa, or even greater than 10 MPa, or even greater than 50 MPa and preferably less than 200 MPa, or even less than 150 MPa, so as to form a green part or "preform". The agglomerates of the powder are effectively deformed under the effect of this pressure.

In step i), the preform is sintered in an oxidizing, inert or reducing atmosphere.

Preferably, when the product contains boron nitride, the atmosphere during the sintering is inert, preferably under vacuum.

Preferably, the sintering is carried out under vacuum, preferably in a vacuum having a value of less than 10 mbar, preferably less than 5 mbar.

The pressure applied during step i) is greater than 1 MPa, preferably greater than 2 MPa, preferably greater than 3 MPa, preferably greater than 4 MPa, preferably greater than 5 MPa, preferably greater than 6 MPa, preferably greater than 7 MPa, preferably greater than 8 MPa, preferably greater than 9 MPa, preferably greater than 10 MPa, preferably greater than 11 MPa, preferably greater than 12 MPa, preferably greater than 13 MPa, preferably greater than 14 MPa, preferably greater than 15 MPa, preferably greater than 16 MPa, preferably greater than 17 MPa, preferably greater than 20 MPa, preferably greater than 25 MPa, preferably greater than 30 MPa, preferably greater than 35 MPa, preferably greater than 40 MPa, preferably greater than 45 MPa, and preferably less than 150 MPa, preferably less than 100 MPa.

Preferably, more than 20%, preferably more than 50% of the pressure is applied to more than 50%, preferably more than 70%, preferably more than 90% of the cycle by counting only the temperature increase and the optional hold at the maximum temperature.

The hold time, the temperature and the atmosphere of the sintering are determined as a function of the nature and characteristics of the product to be manufactured. These parameters are well known to a person skilled in the art.

The maximum temperature reached during the sintering is preferably between 1300° C. and 1700° C., preferably between 1450° C. and 1550° C.

At the end of step i), a sintered product according to the invention is obtained.

Steps h) and i) are preferably carried out within one and the same step, for example by using a hot pressing or SPS ("Spark Plasma Sintering") process.

Preferably, steps h) and i) are carried out within a single step using an SPS process.

Preferably the SPS is carried out:
under vacuum, and/or
at a maximum temperature between 1300° C. and 1700° C., preferably between 1450° C. and 1550° C., and/or
at a pressure of greater than 30 MPa, preferably greater than 40 MPa.

In step j), the sintered product may be machined by any technique known to a person skilled in the art.

In one embodiment, step j) may be carried out on the preform before step i).

In one preferred embodiment, the process according to the invention comprises the following features:

In step a):
the suspended particles represent more than 8% and less than 20% of the volume of the slip, and
the ceramic particles represent more than 95% of the volume of the suspended particles, and
the first and second particulate fractions together represent more than 99% of the assembly of the ceramic particles, as a percentage by volume, and
the particle size distribution of the ceramic particles of the suspension is bimodal, the two main modes corresponding to the first and second particulate fractions, respectively, and
the first particulate fraction, or "platelet fraction", represents more than 94% of the assembly of the ceramic particles, as a percentage by volume, and
more than 99% by volume of the platelets of the first particulate fraction comprise more than 99% by weight of alumina, and
more than 95%, by volume, of the platelets of the first particulate fraction, have a length of less than 20 µm, and of greater than 4 µm, a width of less than 10 µm and of greater than 3 µm, and a thickness less than or equal to 1.5 µm, and
the second particulate fraction represents more than 3% and less than 6% of the ceramic particles, as a percentage by volume on the basis of the assembly of the ceramic particles, and
more than 95%, by number of the particles of the second particulate fraction, have a length at least 25 times less than $L1_{50}$, and
the second particulate fraction comprises glass particles as a mixture with alumina particles, the ratio of the amount by volume of particles which are neither glass particles, nor glass-ceramic particles to the total amount by volume of glass particles and glass-ceramic particles is greater than 0.5 and less than 2.5, and the glass particles are selected from the group of glasses consisting of, to more than 90% by weight, $SiO_2$ on the one hand, and CaO and/or MgO on the other hand, and in step c), the freezing rate is greater than 10 μm/s and less than 100 μm/s, and step d) is a step of removing the ice crystals by sublimation thereof, and the steps h) and i) are carried out within a single step using an SPS process, carried out under vacuum, at a maximum temperature of between 1300° C. and 1700° C., and at a pressure of greater than 30 MPa.

A process according to the invention makes it possible to manufacture a product according to the invention having mechanical properties, and in particular toughnesses, that are remarkable Product According to the Invention A sintered product according to the invention may be obtained or be capable of having been obtained by a process according to the invention.

In one preferred embodiment, more than 50%, preferably more than 60%, preferably more than 70%, preferably more than 80%, preferably more than 90%, preferably more than 95%, preferably more than 98%, preferably more than 99%, preferably substantially 100% by number of the platelets of the sintered product comprise more than 50%, preferably 60%, preferably 70%, preferably 80%, preferably more than 85%, preferably more than 90%, preferably more than 95%, preferably more than 98%, preferably more than 99% of alumina by weight.

In one embodiment, the sintered product contains more than 1%, or even more than 5%, or even more than 10%, or even more than 15% and less than 20% of boron nitride, by weight on the basis of the weight of the product, the boron nitride being present in the form of platelets. Preferably, the other platelets present are platelets comprising more than 50%, preferably 60%, preferably 70%, preferably 80%, preferably more than 85%, preferably more than 90%, preferably more than 95%, preferably more than 98%, preferably more than 99% of alumina by weight. Surprisingly, the addition of boron nitride in the form of platelets does not modify or barely modifies the relative density of the sintered product after sintering and the non-brittle behavior in the SENB method.

More preferably, more than 90%, preferably more than 95%, preferably more than 98%, by number of the platelets have a length of less than 70 μm, preferably less than 60 μm, preferably less than 50 μm, preferably less than 40 μm, preferably less than 25 μm and preferably greater than 2 μm, preferably greater than 4 μm.

The ceramic particles other than the platelets may at least partially not be visible after the sintering step i), which makes the quantification thereof difficult. However they contribute to obtaining a sintered product that has a high relative density.

The relative density of a sintered product according to the invention is preferably greater than 92%, preferably greater than 94%, preferably greater than 95%, preferably greater than 96%, preferably greater than 97%, preferably greater than 97.5%, preferably greater than 98%, preferably greater than 98.5%.

Figure 6:
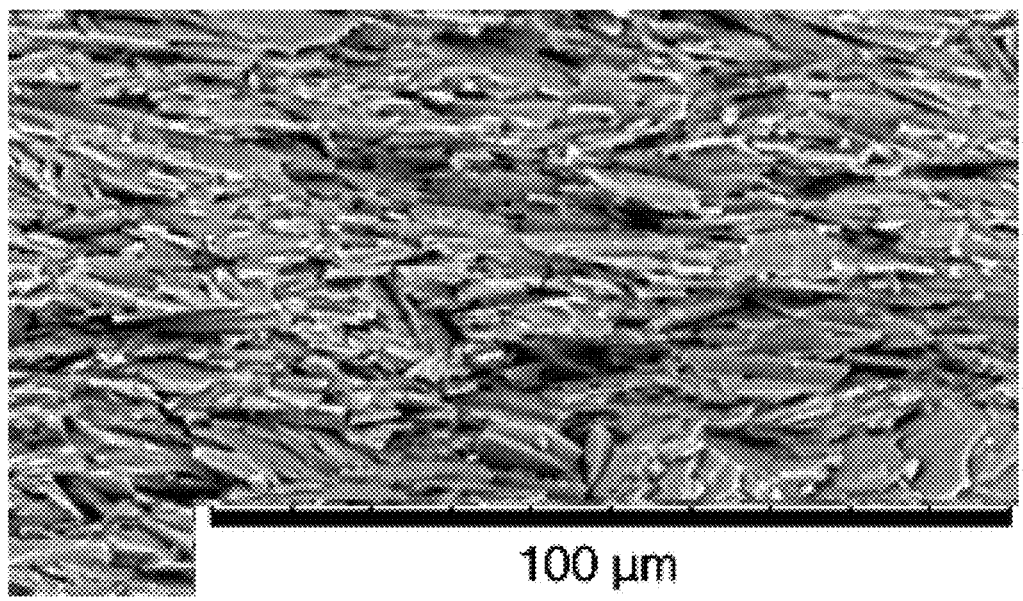
FIG. 6 illustrates the microstructure of the product from example 2, according to the invention.

The platelets are stacked on one another. They therefore extend along substantially parallel planes, as can be seen in FIG. 6 which represents an image of the microstructure of the product from example 2 according to the invention. More specifically, the mean standard deviation around the mean main orientation is less than 20°, preferably less than 16°, the mean main orientation and the mean standard deviation around the mean main orientation being determined by the method described for the examples. A reduction in the mean standard deviation around the mean main orientation considerably improves the toughnesses $K_{1c}$ and $K_{jc}$ of the sintered product.

The mean thickness of the platelets of the sintered product is preferably less than 2.5 μm, preferably less than 2.0 μm, preferably less than 1.5 μm, preferably less than 1.0 μm. Advantageously, the mechanical properties, in particular the modulus of rupture, are improved thereby.

In one embodiment, the width l of the sintered product is greater than 60 mm and less than or equal to 80 mm. In another embodiment, the width of the sintered product is greater than 80 mm, greater than 81 mm, greater than 85 mm, or even greater than 90 mm, or even greater than 100 mm, or even greater than 150 mm.

A sintered product manufactured according to a process according to the invention has a remarkable toughness. Preferably, the crack initiation toughness $K_{1c}$ is greater than 4 MPa·m$^{1/2}$, preferably greater than 4.5 MPa·m$^{1/2}$, preferably greater than 5 MPa·m$^{1/2}$, preferably greater than 5.5 MPa·m$^{1/2}$, preferably greater than 6 MPa·m$^{1/2}$.

More preferably, the toughness $K_{jc}$ is greater than 7 MPa·m$^{1/2}$, preferably greater than 8 MPa·m$^{1/2}$, preferably greater than 9 MPa·m$^{1/2}$.

The toughnesses $K_{1c}$ and $K_{jc}$ may be determined according to the methods described for the examples.

Preferably, the sintered product comprises more than 80% by weight, preferably to more than 95%, preferably to more than 97%, preferably to more than 99% by weight of oxides.

In one embodiment, more than 50%, preferably more than 60%, preferably more than 70%, preferably more than 80%, preferably more than 90%, preferably more than 95%, preferably more than 98%, preferably more than 99%, preferably substantially 100% by number of the platelets comprise more than 50%, preferably 60%, preferably 70%, preferably 80%, preferably more than 85%, preferably more than 90%, preferably more than 95%, preferably more than 98%, preferably more than 99% of alumina by weight.

In a first main embodiment, the chemical analysis of the sintered product is the following, in percentages by weight:
  the content of $SiO_2$ is greater than 0.2%, preferably greater than 0.3%, preferably greater than 0.5%, and preferably less than 13.5%, preferably less than 10%, preferably less than 8%, preferably less than 6%, preferably less than 5%, preferably less than 4%, preferably less than 3%, preferably less than 2%, preferably less than 1.5%, and
  the content of CaO+MgO is greater than 0.1%, preferably greater than 0.15%, or even greater than 0.2%, and/or preferably less than 4.5%, preferably less than 3%, preferably less than 2%, preferably less than 1.5%, preferably less than 1%, preferably less than 0.8%, preferably less than 0.5%, and
  the alumina and the other elements constituting the balance to 100%, the content of other elements being less than 2%, preferably less than 1.5%, preferably less than 1%, preferably less than 0.8%, preferably less than 0.5%.

Preferably in this first main embodiment, the content of $Al_2O_3$ is greater than 81%, preferably greater than 85%, preferably greater than 89%, preferably greater than 90%, preferably greater than 92%, preferably greater than 94%, preferably greater than 95%, preferably greater than 96.9%, and preferably less than 99.7%, preferably less than 99.5%.

In a second main embodiment, the chemical analysis of the product is the following, in percentages by weight:
- the content of $SiO_2$ is greater than 0.2%, preferably greater than 0.3%, preferably greater than 0.5%, and preferably less than 13.5%, preferably less than 10%, preferably less than 8%, preferably less than 6%, preferably less than 5%, preferably less than 4%, preferably less than 3%, preferably less than 2%, preferably less than 1.5%, and
- the content of CaO is greater than 0.1%, preferably greater than 0.15%, or even greater than 0.2%, and preferably less than 4.5%, preferably less than 3%, preferably less than 2%, preferably less than 1.5%, preferably less than 1%, preferably less than 0.8%, preferably less than 0.5%, and
- the content of MgO is less than 0.3%, preferably less than 0.25%, preferably less than 0.2%, preferably less than 0.15%, preferably less than 0.1%, or even less than 0.05%, and
- the alumina and the other elements constituting the balance to 100%, the content of other elements being less than 2%, preferably less than 1.5%, preferably less than 1%, preferably less than 0.8%, preferably less than 0.5%.

Preferably in this second main embodiment, the content of $Al_2O_3$ is greater than 81%, preferably greater than 85%, preferably greater than 89%, preferably greater than 90%, preferably greater than 92%, preferably greater than 94%, preferably greater than 95%, preferably greater than 96.8%, and preferably less than 99.7%, preferably less than 99.5%

In a third main embodiment, the chemical analysis of the product is the following, in percentages by weight:
- the content of $SiO_2$ is greater than 0.2%, preferably greater than 0.3%, preferably greater than 0.5%, and preferably less than 13.5%, preferably less than 10%, preferably less than 8%, preferably less than 6%, preferably less than 5%, preferably less than 4%, preferably less than 3%, preferably less than 2%, preferably less than 1.5%, and
- the content of MgO is greater than 0.1%, preferably greater than 0.15%, or even greater than 0.2%, and preferably less than 4.5%, preferably less than 3%, preferably less than 2%, preferably less than 1.5%, preferably less than 1%, preferably less than 0.8%, preferably less than 0.5%, and
- the content of CaO is less than 0.3%, preferably less than 0.25%, preferably less than 0.2%, preferably less than 0.15%, preferably less than 0.1%, or even less than 0.05%, and
- the alumina and the other elements constituting the balance to 100%, the content of other elements being less than 2%, preferably less than 1.5%, preferably less than 1%, preferably less than 0.8%, preferably less than 0.5%.

Preferably in this third main embodiment, the content of $Al_2O_3$ is greater than 81%, preferably greater than 85%, preferably greater than 89%, preferably greater than 90%, preferably greater than 92%, preferably greater than 94%, preferably greater than 95%, preferably greater than 96.8%, and preferably less than 99.7%, preferably less than 99.5%.

In a fourth main embodiment, the chemical analysis of the product is the following, in percentages by weight:
- the content of optionally stabilized $ZrO_2$ is greater than 1% and less than 15%, and
- the content of $SiO_2$ is greater than 0.2%, preferably greater than 0.3%, preferably greater than 0.5%, and preferably less than 13.5%, preferably less than 10%, preferably less than 8%, preferably less than 6%, preferably less than 5%, preferably less than 4%, preferably less than 3%, preferably less than 2%, preferably less than 1.5%, and
- the content of CaO+MgO is greater than 0.1%, preferably greater than 0.15%, or even greater than 0.2%, and preferably less than 4.5%, preferably less than 3%, preferably less than 2%, preferably less than 1.5%, preferably less than 1%, preferably less than 0.8%, preferably less than 0.5%, and
- the content of alumina and of other elements constituting the balance to 100%, the content of other elements being less than 10%, preferably less than 8%, preferably less than 5%, preferably less than 4%, preferably less than 2%, preferably less than 1.5%, preferably less than 1%, preferably less than 0.8%, preferably less than 0.5%.

Preferably in this fourth main embodiment, the optionally stabilized zirconia $ZrO_2$ originates exclusively from the second particulate fraction.

In a fifth main embodiment, the chemical analysis of the product is the following, in percentages by weight:
- the content of $SiO_2$ is greater than 0.2%, preferably greater than 0.3%, preferably greater than 0.5%, and preferably less than 13.5%, preferably less than 10%, preferably less than 8%, preferably less than 6%, preferably less than 5%, preferably less than 4%, preferably less than 3%, preferably less than 2%, preferably less than 1.5%, and
- the content of CaO+MgO is greater than 0.1%, preferably greater than 0.15%, or even greater than 0.2%, and preferably less than 4.5%, preferably less than 3%, preferably less than 2%, preferably less than 1.5%, preferably less than 1%, preferably less than 0.8%, preferably less than 0.5%, and
- the content of boron nitride is greater than 1% and less than 20%, and
- the content of alumina and of other elements constituting the balance to 100%, the content of other elements being less than 10%, preferably less than 8%, preferably less than 5%, preferably less than 4%, preferably less than 2%, preferably less than 1.5%, preferably less than 1%, preferably less than 0.8%, preferably less than 0.5%.

In a sixth main embodiment, the chemical analysis of the product is the following, in percentages by weight:
- the content of optionally stabilized $ZrO_2$ is greater than 1% and less than 15%, and
- the content of $SiO_2$ is greater than 0.2%, preferably greater than 0.3%, preferably greater than 0.5%, and preferably less than 13.5%, preferably less than 10%, preferably less than 8%, preferably less than 6%, preferably less than 5%, preferably less than 4%, preferably less than 3%, preferably less than 2%, preferably less than 1.5%, and
- the content of CaO+MgO is greater than 0.1%, preferably greater than 0.15%, or even greater than 0.2%, and preferably less than 4.5%, preferably less than 3%, preferably less than 2%, preferably less than 1.5%, preferably less than 1%, preferably less than 0.8%, preferably less than 0.5%, and
- the content of boron nitride is greater than 1% and less than 20%, and the content of alumina and of other elements constituting the balance to 100%, the content of other elements being less than 10%, preferably less than 8%, preferably less than 5%, preferably less than 4%, preferably less than 2%, preferably less than 1.5%, preferably less than 1%, preferably less than 0.8%, preferably less than 0.5%.

Preferably in this sixth main embodiment, the optionally stabilized zirconia $ZrO_2$ originates exclusively from the second particulate fraction.

Regardless of the preceding main embodiment, the "other elements" denote the constituents other than those cited furthermore, the optional stabilizers of the zirconia are not part of the "other elements" if the zirconia is stabilized.

In one embodiment, the sintered product contains a pigment, preferably in an amount of greater than 1%, preferably greater than 3%, preferably greater than 5% and less than 15%, preferably less than 13%, preferably less than 11%, as a percentage by weight.

Preferably, the sintered product consists of, to more than 85% of its volume, preferably to more than 90% of its volume, preferably to more than 95% of its volume, a stack of ceramic platelets.

The volume of platelets of the sintered product may be estimated using fracture surface images taken using a scanning electron microscope (SEM), as described in the examples section of the description.

EXAMPLES

The following nonlimiting examples are given for the purpose of illustrating the invention.

The following raw materials were used:
alumina powder TM-DAR Taimicron sold by the company Krahn Chemie GmbH,
powder of alumina platelets RonaFlair White Sapphire sold by the company Merck,
zirconia powder TZ-3Y sold by the company Tosoh,
colloidal solution of silica Nexsil 20K sold by the company Nyacol,
calcium carbonate $CaCO_3$ powder having a purity greater than or equal to 99%, sold by Sigma-Aldrich,
powder of Darvan 7NS sold by the company VanderBilt,
powder of Carbopol EDT 2691 sold by the company Lubrizol,
Tergitol NP-9 sold by the company Sigma-Aldrich,
powder of hexagonal boron nitride platelets Tres BN PUHP 3016 sold by the company Saint-Gobain,
powder of pigment 220943 Co—Al—Zn—Si, sold by the company Ferro.

The products of the examples were manufactured according to a process according to the invention.

Example 1

The product of example 1, outside the invention, is the product from example 11 of WO2015189659.

Example 2

The product of example 2, according to the invention, is manufactured according to the following process:

In step a), the constituents that appear in table 1a below were mixed, so as to form a slip, according to the following procedure: the Darvan 7NS is dispersed in water; the second particulate fraction is then added, everything is then mixed for 12 hours in a roller bottle, with alumina balls, to ensure a good dispersion; the Carbopol EDT 2691 and the first particulate fraction are then added, and the suspension is then mixed for 3 hours in a roller bottle with alumina balls so as to obtain the slip.

In tables 1a, 2a, 3a and 4a, % V denotes a percentage by volume on the basis of the volume of the slip.

TABLE 1a

| Constituents of example 2 | % V |
|---|---|
| First particulate fraction: Powder RonalFlair White Sapphire | 13.27 |
| Second particulate fraction: Alumina powder TM-DAR Taimicron | 0.41 |
| Second particulate fraction: Colloidal solution of silica Nexsil 20K | 0.95 |
| Second particulate fraction: Calcium carbonate $CaCO_3$ | 0.14 |
| Carbopol EDT 2691 | 0.25 |
| Darvan 7NS | 0.55 |
| Deionized water | 84.43 |

Characteristics of Example 2

TABLE 1b

| | |
|---|---|
| % by volume of the assembly of the ceramic particles on the basis of the volume of the slip | 13.97 |
| % by volume of the first particulate fraction, on the basis of the volume of the assembly of the ceramic particles | 95 |
| Median length $L1_{50}$ of the first particulate fraction (µm) | 9 |
| Mean thickness $W1_{50}$ of the first particulate fraction (µm) | 0.5 |
| % by volume of the second particulate fraction, on the basis of the assembly of the ceramic particles | 5 |
| % by volume of glass particles of the second particulate fraction, on the basis of the volume of the assembly of the ceramic particles | 2.1 |
| % by volume of ceramic particles of the second particulate fraction other than the glass particles, on the basis of the volume of the assembly of the ceramic particles | 2.9 |
| Median length $D_{50}$ of the glass particles of the second particulate fraction (µm) | 0.02 |
| Median length $D_{50}$ of the ceramic particles which are not particles of glass or glass precursor of the second particulate fraction (µm) | 0.1 |

No degassing step b) was carried out.

In step c), the slip is poured into a wide stainless steel container, the height of slip in the container being equal to around 15 mm. The container is then rapidly immersed in a bath of liquid nitrogen. The complete freezing of the slip is carried out in around 20 minutes. The frozen slip is then removed from the mold.

In step d), the frozen slip is placed in a freeze dryer. A temperature sensor placed under the block of frozen slip makes it possible to monitor the evolution of the freeze-drying. The pressure setpoint inside the freeze dryer is set at 0.2 mbar absolute. The freeze-drying time is around 5 days. At the end of step d), an intermediate product in the form of a dry block is obtained, having a weak mechanical strength.

In step e), the block is milled using a hand press and the powder obtained is screened to 1 mm In steps f) and g) (grouped together in a single step), the powder is placed in a furnace to undergo a heat treatment that consists of a temperature increase at 50° C./h, a hold for one hour at 400° C., an increase at 100° C./h up to 900° C. and a decrease at 300° C./h. This heat treatment makes it possible, on the one hand, to remove the organic elements from the powder and, on the other hand, to strengthen the adhesion of the ceramic particles of the second particulate fraction to the platelets.

In step h), a graphite die, with a diameter of 80 mm, is filled with powder. The powder is then pressed at ambient temperature at a pressure of 5 MPa to form a preform.

In step i), the die is placed in an SPS H-HP D 320 furnace from the company FCT Systeme GmbH. The preform then undergoes pressure sintering, at 1500° C., for 15 minutes at a pressure equal to 50 MPa. The rate of increase to the hold temperature is equal to 100° C./min.

At the end of step i), a sintered product according to the invention, having a diameter equal to 80 mm, is obtained.

Example 3

For example 3, steps a), c), d), e), f) and g) identical to those of example 2 were carried out.

In step h), the powder is shaped by pressing, with a pressure of 200 MPa so as to obtain a preform.

In step i), the preform is sintered without application of a pressure during the sintering, according to the following cycle: an increase in temperature equal to 5° C./min is carried out up to 1500° C., the temperature is then maintained for 2 hours at 1500° C., the decrease in temperature is carried out at a rate equal to 5° C./min.

At the end of step i), a sintered product, having a diameter equal to 80 mm, is obtained.

The comparative example 3 is intended to illustrate the importance of the application of a pressure of greater than 0.5 MPa during the sintering step i).

Example 4

The product of example 4 is manufactured according to the following process:

In step a), the constituents that appear in table 2a below were mixed, so as to form a slip, according to the following procedure:

the boron nitride platelets are added to a mixture of water and Tergitol, which makes it possible to suspend them, then everything is stirred for 12 hours in a beaker, with a magnetic stirrer;
the Darvan 7NS is dispersed in water;
the second particulate fraction is then added, everything is then mixed for 12 hours in a roller bottle, with alumina balls, to ensure a good dispersion;
the alumina platelets are then added and the slip is mixed for 3 hours in a roller bottle;
lastly, the Carbopol and the BN platelets in suspension are added and the assembly is mixed for 3 hours in a roller bottle.

TABLE 2a

| Constituents of example 4 | % V |
|---|---|
| First particulate fraction: Powder RonalFlair White Sapphire | 9.95 |
| First particulate fraction: BN powder Très BN 3016 | 4.72 |
| Second particulate fraction: Alumina powder TM-DAR Taimicron | 0.39 |
| Second particulate fraction: Colloidal solution of silica Nexsil 20K | 0.89 |
| Second particulate fraction: Calcium carbonate CaCO$_3$ | 0.13 |
| Carbopol EDT 2691 | 0.24 |
| Darvan 7NS | 0.51 |
| Tergitol | 0.05 |
| Deionized water | 83.12 |

Characteristics of Example 4

TABLE 2b

| | |
|---|---|
| % by volume of the assembly of the ceramic particles, on the basis of the volume of the slip | 15.33 |
| % by volume represented by the first particulate fraction, on the basis of the volume of the assembly of the ceramic particles | 95.7 |
| Median length L1$_{50}$ of the first particulate fraction (μm) - White Sapphire | 9 |

TABLE 2b-continued

| | |
|---|---|
| Mean thickness W1$_{50}$ of the first particulate fraction (μm) - White Sapphire | 0.5 |
| Median length L1$_{50}$ of the first particulate fraction (μm) - BN | 16 |
| Mean thickness W1$_{50}$ of the first particulate fraction (μm) - BN | 1 |
| % by volume represented by the second particulate fraction, on the basis of the volume of the assembly of the ceramic particles | 4.3 |
| % by volume of glass particles of the second particulate fraction, on the basis of the volume of the assembly of the ceramic particles | 1.8 |
| % by volume of ceramic particles of the second particulate fraction other than the glass particles, on the basis of the volume of the assembly of the ceramic particles | 2.5 |
| Median length D$_{50}$ of the glass particles of the second particulate fraction (μm) | 0.02 |
| Median length D$_{50}$ of the ceramic particles which are not particles of glass or glass precursor of the second particulate fraction (μm) | 0.1 |

Steps c), d) and e) are identical to those of example 2.

In steps f) and g) (grouped together in a single step), the intermediate product in powder form is placed in a furnace to undergo a heat treatment. This treatment is carried out in an air atmosphere up to 600° C., with an increase at 50° C./h. At 600° C., the atmosphere changes to nitrogen, in order to prevent the oxidation of the boron nitride. The temperature is then brought to 900° C. with a rate of increase equal to 100° C./h. The decrease is carried out at a rate equal to 300° C./h.

Steps h), i) and j) are identical to those of example 2.

Example 4 is intended to illustrate the possibility of a limited alumina content in the platelets.

Example 5

The product of example 5 is manufactured according to the following process:

In step a), the constituents that appear in table 3a below were mixed, so as to form a slip, according to the following procedure: the Darvan 7NS is dispersed in water; the second particulate fraction is then added, everything is then mixed for 12 hours in a roller bottle, with alumina balls, to ensure a good dispersion; the Carbopol EDT 2691 and the first particulate fraction are then added, and the suspension is then mixed for 3 hours in a roller bottle with alumina balls so as to obtain the slip.

TABLE 3a

| Constituents of example 5 | % V |
|---|---|
| First particulate fraction: Powder RonalFlair White Sapphire | 13.27 |
| Second particulate fraction: Zirconia powder TZ-3Y | 0.41 |
| Second particulate fraction: Colloidal solution of silica Nexsil 20K | 0.95 |
| Second particulate fraction: Calcium carbonate CaCO$_3$ | 0.14 |
| Carbopol EDT 2691 | 0.25 |
| Darvan 7NS | 0.55 |
| Deionized water | 84.43 |

Characteristics of Example 5

TABLE 3b

| | |
|---|---|
| % by volume of the assembly of the ceramic particles on the basis of the volume of the slip | 13.97 |
| % by volume of the first particulate fraction, on the basis of the volume of the assembly of the ceramic particles | 95 |
| Median length L1$_{50}$ of the first particulate fraction (μm) | 9 |
| Mean thickness W1$_{50}$ of the first particulate fraction (μm) | 0.5 |
| % by volume of the second particulate fraction, on the basis of the assembly of the ceramic particles | 5 |
| % by volume of glass particles of the second particulate fraction, on the basis of the volume of the assembly of the ceramic particles | 2.1 |

TABLE 3b-continued

| | |
|---|---|
| % by volume of ceramic particles of the second particulate fraction other than the glass particles, on the basis of the volume of the assembly of the ceramic particles | 2.9 |
| Median length $D_{50}$ of the glass particles of the second particulate fraction (μm) | 0.02 |
| Median length $D_{50}$ of the ceramic particles which are not particles of glass or glass precursor of the second particulate fraction (μm) | 0.2 |

No degassing step b) was carried out.

In step c), the slip is poured into a wide stainless steel container, the height of slip in the container being equal to around 15 mm. The container is then rapidly immersed in a bath of liquid nitrogen. The complete freezing of the slip is carried out in around 20 minutes. The frozen slip is then removed from the mold.

In step d), the frozen slip is placed in a freeze dryer. A temperature sensor placed under the block of frozen slip makes it possible to monitor the evolution of the freeze-drying. The pressure setpoint inside the freeze dryer is set at 0.2 mbar absolute. The freeze-drying time is around 5 days. At the end of step d), an intermediate product in the form of a dry block is obtained, having a weak mechanical strength.

In step e), the block is milled using a hand press and the powder obtained is screened to 1 mm In steps f) and g) (grouped together in a single step), the powder is placed in a furnace to undergo a heat treatment that consists of a temperature increase at 50° C./h, a hold for one hour at 400° C., an increase at 100° C./h up to 900° C. and a decrease at 300° C./h. This heat treatment makes it possible, on the one hand, to remove the organic elements from the powder and, on the other hand, to strengthen the adhesion of the ceramic particles of the second particulate fraction to the platelets.

In step h), a cylindrical graphite die, with a diameter of 80 mm, is filled with powder. The powder is then pressed at ambient temperature at a pressure of 5 MPa to form a preform.

In step i), the die is placed in an SPS H-HP D 320 furnace from the company FCT Systeme GmbH. The preform then undergoes pressure sintering, at 1500° C., for 15 minutes at a pressure equal to 50 MPa. The rate of increase to the hold temperature is equal to 100° C./min.

At the end of step i), a sintered product according to the invention, having a diameter equal to 80 mm, is obtained.

Example 6

The product of example 6 is manufactured according to the following process:

In step a), the constituents that appear in table 3a below were mixed, so as to form a slip, according to the following procedure: the Darvan 7NS is dispersed in water; the second particulate fraction and the pigment powder are then added, everything is then mixed for 12 hours in a roller bottle, with alumina balls, to ensure a good dispersion; the Carbopol EDT 2691 and the first particulate fraction are then added, and the suspension is then mixed for 3 hours in a roller bottle with alumina balls so as to obtain the slip.

A portion of the particles of the pigment powder 220943 have a length of less than 1 μm.

TABLE 4a

| Constituents of example 6 | % V |
|---|---|
| First particulate fraction: Powder RonalFlair White Sapphire | 11.87 |
| Second particulate fraction: Alumina powder TM-DAR Taimicron | 0.41 |
| Second particulate fraction: Colloidal solution of silica Nexsil 20K | 1.26 |

TABLE 4a-continued

| Constituents of example 6 | % V |
|---|---|
| Second particulate fraction: Calcium carbonate $CaCO_3$ | 0.03 |
| Pigment powder 220943: partially in the second particulate fraction | 1.18 |
| Carbopol EDT 2691 | 0.18 |
| Darvan 7NS | 0.47 |
| Deionized water | 84.60 |

Characteristics of Example 6

TABLE 4b

| | |
|---|---|
| % by volume of the assembly of the ceramic particles on the basis of the volume of the slip | 13.68 |
| % by volume of the first particulate fraction, on the basis of the volume of the assembly of the ceramic particles | 86.25 |
| Median length $L1_{50}$ of the first particulate fraction (μm) | 9 |
| Mean thickness $W1_{50}$ of the first particulate fraction (μm) | 0.5 |
| % by volume of the second particulate fraction excluding pigment particles, on the basis of the assembly of the ceramic particles | 4.47 |
| % by volume of glass particles of the second particulate fraction, on the basis of the volume of the assembly of the ceramic particles | 1.47 |
| % by volume of ceramic particles of the second particulate fraction other than the glass particles and the pigment particles, on the basis of the volume of the assembly of the ceramic particles | 3 |
| % by volume of pigment particles, on the basis of the assembly of the ceramic particles | 9.28 |
| Median length $D_{50}$ of the glass particles of the second particulate fraction (μm) | 0.02 |
| Median length $D_{50}$ of the ceramic particles of the second particulate fraction which are not particles of glass or glass precursor or pigment particles (μm) | 0.1 |

No degassing step b) was carried out.

In step c), the slip is poured into a wide stainless steel container, the height of slip in the container being equal to around 15 mm. The container is then rapidly immersed in a bath of liquid nitrogen. The complete freezing of the slip is carried out in around 20 minutes. The frozen slip is then removed from the mold.

In step d), the frozen slip is placed in a freeze dryer. A temperature sensor placed under the block of frozen slip makes it possible to monitor the evolution of the freeze-drying. The pressure setpoint inside the freeze dryer is set at 0.2 mbar absolute. The freeze-drying time is around 5 days. At the end of step d), an intermediate product in the form of a dry block is obtained, having a weak mechanical strength.

In step e), the block is milled using a hand press and the powder obtained is screened to 1 mm In steps f) and g) (grouped together in a single step), the powder is placed in a furnace to undergo a heat treatment that consists of a temperature increase at 50° C./h, a hold for one hour at 400° C., an increase at 100° C./h up to 900° C. and a decrease at 300° C./h. This heat treatment makes it possible, on the one hand, to remove the organic elements from the powder and, on the other hand, to strengthen the adhesion of the ceramic particles of the second particulate fraction to the platelets.

In step h), a graphite die, with a diameter of 80 mm, is filled with powder. The powder is then pressed at ambient temperature at a pressure of 5 MPa to form a preform.

In step i), the die is placed in an SPS H-HP D 320 furnace from the company FCT Systeme GmbH. The preform then undergoes pressure sintering, at 1500° C., for 15 minutes at a pressure equal to 50 MPa. The rate of increase to the hold temperature is equal to 100° C./min.

At the end of step i), a sintered product according to the invention, of blue color and having a diameter equal to 80 mm, is obtained.

Example 6 is intended to illustrate the possibility of using a pigment powder in order to obtain a coloration of the sintered product.

Characterization

The following characterization methods were used:

The dimensions of the particles, (and the data which derive therefrom, such as the median dimensions), are determined by the following method.

Some powder of particles is suspended in ethanol, so as to thoroughly disperse said particles. This suspension is then spread on a conductive support, such as carbon adhesive tape used in electronic imaging. At least 5 images are taken using a scanning electron microscope (SEM), each image having at least 1280×960 pixels, without the scale bar. The magnification is determined so that the width of the image makes it possible to view between 2 and 20 individual particles, i.e. particles that are not agglomerated. If this is not the case, it is necessary to start again with a suspension having a lower ratio of volume of particles to volume of ethanol. The image must present particles having a thickness that appears as substantially parallel to the viewing plane.

The thickness of the particles, W1, is then measured by analysis of said images using the Fiji software, plotting lines delimiting the particles then using the "Analyze>Measure" tool of said software. The "length" column of the results table provides the mean thickness of the particles. The correspondence between pixel and unit of length may be obtained beforehand using the "Set Scale" tool and measuring the number of pixels of the scale bar. The mean thickness of the particles of the powder, W1*, is the mean of the measured thicknesses W1.

The length L1 and the width W2 of each particle is also measured.

The orientation of the platelets is determined by the following method:

A bar of the product to be analyzed is cut perpendicular to the direction of the pressure applied during the sintering.

This bar is then notched at the center thereof over a tenth of the thickness, bent and fractured using a hammer.

A flat fracture surface, parallel to the pressing direction, is thus created.

At least 15 images of said fracture surface are taken using a scanning electron microscope (SEM). Each image has at least 1280×950 pixels, without the scale bar.

The direction of orientation of the platelets is estimated by the orientation of the pixels of each image, linked to the local gradient of the gray scale, and measured using the OrientationJ tool of the ImageJ software, the function used being OrientationJ-OrientationJ Distribution.

The mean direction of orientation is the mean of the directions of orientation calculated on all of the images.

The mean standard deviation around the mean direction of orientation is equal to the mean of the standard deviations of the directions of orientation calculated on each of the images.

The absolute density is measured by helium pycnometry.

The bulk density is measured by imbibition, according to the principle of hydrostatic buoyancy.

The measurements of toughness $K_{jc}$ and of crack initiation toughness Kip are carried out at ambient temperature, as described in "Strong, tough and stiff bioinspired ceramics from brittle constituents—supplementary information", Bouville et al., Nature Materials, Vol. 13, pages 508-514 (2014), with the following differences:

the test specimens used have dimensions equal to 3×6×36 $mm^3$,
the notch made has a depth equal to 2.7 mm,
the test performed is a 4-point bending test.

The toughness value $K_{jc}$ corresponds to the toughness for a projected crack extension in the axis of the notch equal to 0.3 mm.

The volume of platelets of the sintered products is estimated using the following method: Five bars of the product to be analyzed are cut randomly.

Each bar is then notched at the center thereof over a tenth of the thickness, bent and fractured using a hammer A flat fracture surface is thus created.

At least 2 images of said fracture surface are taken using a scanning electron microscope (SEM). Each image has at least 1280×950 pixels, without the scale bar.

The surface area covered by the platelets is determined on each image.

The mean of the surface areas covered determined on each image is an estimation of the volume of platelets of the sintered product.

For the elements other than nitrogen, the chemical analysis of the sintered products is measured by "Inductively Coupled Plasma" or ICP for the elements having an amount that does not exceed 0.5%; for the content of the other elements, a pearl of the product to be analyzed is manufactured by melting the product, then the chemical analysis is carried out by x-ray fluorescence.

The nitrogen content of the sintered product is conventionally determined by thermal conductivity, for example on a LECO TC 436DR series device.

Results

The results obtained are summarized in table 5 below:

TABLE 5

| Example | 1* | 2 | 3* | 4 | 5 | 6 |
|---|---|---|---|---|---|---|
| Chemical analysis (% by weight) | | | | | | |
| $Al_2O_3$ | 98.5 | 98.4 | 98.4 | 79.2 | 94.7 | 95 |
| $SiO_2$ | 0.86 | 0.75 | 0.75 | 0.75 | 0.75 | 1.65 |
| CaO | 0.14 | 0.25 | 0.25 | 0.25 | 0.25 | 0.25 |
| BN | — | — | — | 19.1 | — | — |
| $ZrO_2$ | — | — | — | — | 4 | — |
| Other elements | 0.5 | 0.60 | 0.60 | 0.70 | 0.3 | 3.1 |
| including MgO | <0.1 | <0.1 | <0.1 | <0.1 | <0.1 | <0.1 |
| including $Co_3O_4$ | — | — | — | — | — | 2.5 |
| Sintered product | | | | | | |
| Width of the part (mm) | 20 | 80 | 80 | 80 | 80 | 80 |
| Relative density (%) | 98.8 | 97.9 | 55.7 | 94.7 | 98.3 | 97.5 |
| Stack of platelets | Yes | Yes | Yes | Yes | Yes | Yes |
| More than 80% of the volume of the sintered product is composed of platelets | Yes | Yes | Yes | Yes | Yes | Yes |
| The mean standard deviation around the mean direction of orientation (°) | 15 | 16.8 | n.d. | 18 | 17.5 | 18.7 |
| Mean thickness of the platelets (μm) | ≤3 | ≤3 | ≤3 | ≤3 | ≤3 | ≤3 |
| Crack initiation toughness $K_{1c}$ (MPa·$m^{1/2}$) | 6.2 | 6.3 | n.d. | 3.8 | 6.1 | 5.1 |
| $K_{jc}$ (MPa·$m^{1/2}$) | 7.9 | 9.6 | n.d. | 8.1 | 9.7 | 7.7 | n.d.: Not determined
*comparative example

The process of example 1 makes it possible to obtain a product having a density, a toughness $K_{1c}$ and a toughness $K_{jc}$ that are high, equal to 98.8%, 6.2 MPa·$m^{1/2}$ and 7.9 MPa·$m^{1/2}$, respectively. The width of this product is however inevitably less than 50 mm.

The process of example 2 makes it possible to obtain a product having a density, a toughness $K_{1c}$ and a toughness $K_{jc}$ that are high, equal to 97.9%, 6.3 MPa·$m^{1/2}$ and 9.6 MPa·$m^{1/2}$, respectively.

Advantageously, the width of this product is 80 mm.

The process of example 3 makes it possible to obtain a product having a width equal to 80 mm. The absence of application of a pressure of greater than 0.5 MPa during the sintering step i) results however in a density much lower than that of example 1, of 55.7%.

The process of example 4 makes it possible to obtain a product having a width equal to 80 mm and having a density equal to 94.7%, and that does not exhibit brittle behavior, the value of $K_je$ being greater than the value of $K_{1c}$, these values being 8.1 MPa·m$^{1/2}$ and 3.8 MPa·m$^{1/2}$ respectively.

The process of example 5 makes it possible to obtain a product having a width equal to 80 mm and having a density equal to 98.3%, and that does not exhibit brittle behavior, the value of $K_je$ being greater than the value of $K_{1c}$, these values being 9.7 MPa·m$^{1/2}$ and 6.1 MPa·m$^{1/2}$ respectively.

The process of example 6 makes it possible to obtain a product of blue color, having a width equal to 80 mm and having a density equal to 97.5%, and that does not exhibit brittle behavior, the value of $K_{jc}$ being greater than the value of $K_{1c}$, these values being 7.7 MPa·m$^{1/2}$ and 5.1 MPa·m$^{1/2}$ respectively.

As is now clearly apparent, the invention provides a process which makes it possible to manufacture a remarkably dense sintered product, which is not brittle and may have any dimensions. This process, which combines the preparation of a specific powder using an operation of freezing/removal of ice crystals, and a pressure sintering, is advantageously simple to implement.

Of course, the present invention is not limited to the embodiments described and represented, provided as examples.

In particular, the invention is not limited by the shape of the products.

The invention claimed is:

1. A sintered product
    having a relative density of greater than 90%,
    comprising, to more than 80% of the volume thereof, a stack of ceramic platelets (10), each platelet having major faces that are substantially flat and parallel to one another, the ceramic platelets being stacked flat, so that said major faces of said platelets extend parallelly to a general plane, the set of said platelets having a mean thickness of less than 3 μm,
    having a width (l) of greater than 50 mm, and
    comprising more than 20% of alumina, as a percentage on the basis of the weight of the product,
    the width (l) of the product being the largest dimension measured in the plane (C) in which the length of the product is measured, along a direction perpendicular to the direction of said length,
    the length (L) of said product being the largest dimension thereof in a plane (C) parallel to said general plane.

2. The product as claimed in claim 1, having
    a crack initiation toughness $K_{1c}$ of greater than 3.5 MPa·m$^{1/2}$ and/or
    a toughness $K_{jc}$ of greater than 6 MPa·m$^{1/2}$, and/or
    a relative density of greater than 95%, and/or
    a mean platelet thickness of less than 2.0 μm, and/or
    a width of greater than 60 mm, and/or wherein
    more than 70% by number of the platelets comprise more than 70% by weight of alumina.

3. The product as claimed in claim 2, having
    a crack initiation toughness $K_{1c}$ of greater than 5 MPa·m$^{1/2}$, and/or
    a toughness $K_{jc}$ of greater than 8 MPa·m$^{1/2}$, and/or
    a relative density of greater than 98%, and/or
    a mean platelet thickness of less than 1.5 μm, and/or
    a width of greater than 85 mm, and/or wherein
    more than 95% by number of the platelets comprise more than 95% by weight of alumina.

4. The product as claimed in claim 1, containing more than 1% and less than 20% of boron nitride, by weight on the basis of the weight of said product, the boron nitride being present in the form of platelets.

5. The product as claimed in claim 1, wherein more than 90% by number of the platelets have a length of less than 70 μm and greater than 2 μm.

6. The product as claimed in claim 1, having a chemical analysis such that, as percentages by weight:
    the content of $SiO_2$ is greater than 0.2% and less than 13.5%, and
    the content of CaO+MgO is greater than 0.1% and less than 4.5%, and
    the total content of $Al_2O_3$ and of "other elements" constituting the balance to 100%, the content of other elements being less than 2%,
    or such that
    the content of $SiO_2$ is greater than 0.2% and less than 13.5%, and
    the content of CaO is greater than 0.1% and less than 4.5%, and
    the content of MgO is less than 0.3%, and
    the total content of $Al_2O_3$ and of "other elements" constituting the balance to 100%, the content of other elements being less than 2%,
    or such that
    the content of $SiO_2$ is greater than 0.2%, and less than 13.5%, and
    the content of MgO is greater than 0.1% and less than 4.5%, and
    the content of CaO is less than 0.3%, and
    the total content of $Al_2O_3$ and of "other elements" constituting the balance to 100%, the content of other elements being less than 2%,
    or such that
    the content of optionally stabilized $ZrO_2$ is greater than 1% and less than 15%, and
    the content of $SiO_2$ is greater than 0.2% and less than 13.5%, and
    the content of CaO+MgO is greater than 0.1% and less than 4.5%, and
    the total content of $Al_2O_3$ and of "other elements" constituting the balance to 100%, the content of other elements being less than 10%,
    or such that
    the content of $SiO_2$ is greater than 0.2% and less than 13.5%, and
    the content of CaO+MgO is greater than 0.1% and less than 4.5%, and
    the content of boron nitride is greater than 1% and less than 20%, and
    the total content of $Al_2O_3$ and of "other elements" constituting the balance to 100%, the content of other elements being less than 10%,
    or such that
    the content of optionally stabilized $ZrO_2$ is greater than 1% and less than 15%, and
    the content of $SiO_2$ is greater than 0.2% and less than 13.5%, and
    the content of CaO+MgO is greater than 0.1% and less than 4.5%, and
    the content of boron nitride is greater than 1% and less than 20%, and the total content of $Al_2O_3$ and of "other elements" constituting the balance to 100%, the content of other elements being less than 10%.

7. The product as claimed in claim 6, having a chemical analysis such that, as percentages by weight:
the content of $Al_2O_3$ is greater than 95% and less than 99.7%, and
the content of $SiO_2$ is greater than 0.2% and less than 2%, and
the content of CaO+MgO is greater than 0.1% and less than 1.5%, and
the content of other elements is less than 1.5%,
or such that
the content of $Al_2O_3$ is greater than 95% and less than 99.7%, and
the content of $SiO_2$ is greater than 0.2% and less than 2%, and
the content of CaO is greater than 0.1% and less than 1.5%, and
the content of MgO is less than 0.3%, and
the content of other elements is less than 1.5%,
or such that
the content of $Al_2O_3$ is greater than 95% and less than 99.7%, and
the content of $SiO_2$ is greater than 0.2%, and less than 2%, and
the content of MgO is greater than 0.1% and less than 1.5%, and
the content of CaO is less than 0.3%, and
the content of other elements is less than 1.5%,
or such that
the content of optionally stabilized $ZrO_2$ is greater han 1% and less than 15%, and
the content of $SiO_2$ is greater than 0.2% and less than 2%, and
the content of CaO+MgO is greater than 0.1% and less than 1.5%, and
the content of other elements is less than 1.5%, and
the balance to 100% is alumina,
or such that
the content of $SiO_2$ is greater than 0.2% and less than 2%, and
the content of CaO+MgO is greater than 0.1% and less than 1.5%, and
the content of boron nitride is greater than 1% and less than 20%, and
the content of other elements is less than 1.5%, and
the balance is alumina,
or such that
the content of optionally stabilized $ZrO_2$ is greater than 1%and less than 15%, and
the content of $SiO_2$ is greater than 0.2% and less than 2%, and
the content of CaO+MgO is greater than 0.1% and less than 1.5%, and
the content of boron nitride is greater than 1% and less than 20%, and
the content of other elements is less than 1.5%, and
the balance is alumina.

8. The product as claimed in claim 7, having a chemical analysis such that, as percentages by weight:
the content of $Al_2O_3$ is greater than 96.9% and less than 99.5%, and
the content of $SiO_2$ is greater than 0.2% and less than 1.5%, and
the content of CaO+MgO is greater than 0.1% and less than 0.8%, and
the content of other elements is less than 0.8%
or such that
the content of $Al_2O_3$ is greater than 96.8% and less than 99.5%, and
the content of $SiO_2$ is greater than 0.2% and less than 1.5%, and
the content of CaO is greater than 0.1% and less than 0.8%, and
the content of MgO is less than 0.1%, and
the content of other elements is less than 0.8%,
or such that
the content of $Al_2O_3$ is greater than 96.8% and less than 99.5%, and
the content of $SiO_2$ is greater than 0.2%, and less than 1.5%, and
the content of MgO is greater than 0.1% and less than 0.8%, and
the content of CaO is less than 0.1%, and
the content of other elements is less than 0.8%,
or such that
the content of optionally stabilized $ZrO_2$ is greater than 1% and less than 15%, and
the content of $SiO_2$ is greater than 0.2% and less than 1.5%, and
the content of CaO+MgO is greater than 0.1% and less than 0.8%, and
the content of other elements is less than 0.8%, and
the balance to 100% is alumina,
or such that
the content of $SiO_2$ is greater than 0.2% and less than 1.5%, and
the content of CaO+MgO is greater than 0.1% and less than 0.8%, and
the content of boron nitride is greater than 1% and less than 20%, and
the content of other elements is less than 0.8%, and
the balance is alumina,
or such that
the content of optionally stabilized $ZrO_2$ is greater than 1% and less than 15%, and
the content of $SiO_2$ is greater than 0.2% and less than 1.5%, and
the content of CaO+MgO is greater than 0.1% and less than 0.8%, and
the content of boron nitride is greater than 1% and less than 20%, and
the content of other elements is less than 0.8%, and
the balance is alumina.

9. A process for manufacturing a sintered product, said process comprising the following steps:
a) preparing a slip comprising an set of ceramic particles suspended in a liquid phase, the set of the ceramic particles representing more than 90% of the volume of the suspended particles and comprising:
a first particulate fraction consisting of platelets having a length of greater than or equal to 1 μm, the first particulate fraction having a median length $L1_{50}$ and representing more than 80% of the ceramic particles, as percentage by volume on the basis of the set of the ceramic particles, more than 50% by volume of said platelets each comprising more than 50% by weight of alumina; and
a second particulate fraction of particles having a length of less than 1 μm, the second particulate fraction having a median length D50 at least 10 times less than $L1_{50}$ and representing more than 1% of the ceramic particles, as percentage by volume on the basis of the set of the ceramic particles, the particles of said second particulate fraction being constituted, to more than 90% by weight, of oxides b) optionally, removing air bubbles contained in the slip,
c) freezing the slip so as to form a frozen slip incorporating ice crystals;
d) removing the ice crystals, so as to obtain an intermediate product, and optionally drying of said intermediate product;
e) if the intermediate product is not in the form of a powder, the particles of which pass through the square meshes of a screen with sides of 25 mm, miffing and/or screening of said intermediate product so that the intermediate product is in the form of such a powder;
f) optionally, debinding said intermediate product;
g) optionally, thermal pretreatment;
h) shaping of the intermediate product by pressing, by injection molding or by extrusion so as to obtain a preform;
i) sintering the preform with application of a pressure of greater than 0.5 MPa so as to obtain a sintered product, it being possible for the steps h) and i) to be carried out in a single unique step;
j) optionally, machining of said sintered product, wherein the first and second particulate fractions are selected so that the sintered product obtained at the end of step i) is a sintered product having a relative density of greater than 90%,
comprising, to more than 80% of the volume thereof, a stack of ceramic platelets (10), a platelet having major faces that are substantially flat and parallel to one another, the ceramic platelets being stacked flat, so that said major faces of said platelets extend parallely to a general plane, the set of said platelets having a mean thickness of less than 3 μm,
having a width (l) of greater than 50 mm, and
comprising more than 20% of alumina, as a percentage on the basis of the weight of the product,
the width (l) of the product being the largest dimension measured in the plane (C) in which the length of the product is measured, along a direction perpendicular to the direction of said length,
the length (L) of said product being the largest dimension thereof in a plane (C) parallel to the general plane in which the platelets extend.

10. The process as claimed in claim 9, wherein in step h), the shaping of the intermediate product is carried out by pressing at a pressure of greater than 3 MPa.

11. The process as claimed in clam 9, wherein in step a), the suspended particles represent more than 1% and less than 45% of the volume of the slip.

12. The process as claimed in claim 9, wherein in step a), the ceramic particles represent more than 95% of the volume of the suspended particles.

13. The process as claimed in claim 9, wherein in step a), the first and second particulate fractions together represent more than 95% of the set of the ceramic particles, as a percentage by volume.

14. The process as claimed in claim 9, wherein in step a), more than 95% by volume of the platelets of the first particulate fraction comprise more than 98% by weight of alumina.

15. The process as claimed in claim 14, wherein in step a), more than 99% by volume of the platelets of the first particulate fraction comprise more than 99% by weight of alumina.

16. The process as claimed in claim 9, wherein in step a), more than 80% by volume of the platelets of the first particulate fraction have a length of less than 70 μm.

17. The process as claimed in claim 9, wherein the pressure applied during step i) is greater than 20 MPa and less than 150 MPa.

18. The process as claimed in claim 17, wherein the pressure applied during step i) is greater than 40 MPa and less than 100 MPa.

19. The process as claimed in claim 9, wherein the steps h) and i) are carried out within one and the same step.

20. The process as claimed in claim 19, wherein the steps h) and i) are carried out within a single step using an SPS process.

21. The process as claimed in claim 9, wherein in step d), the removal of the ice crystals is obtained by freeze-drying.

22. The process as claimed in claim 9, wherein the second particulate fraction represents more than 3% and less than 10% of the ceramic particles, as a percentage by volume on the basis of the set of the ceramic particles.

23. The process as claimed in claim 9, wherein more than 90% by number of the particles of the second particulate fraction have a length at least 15 times less than $L1_{50}$.

24. The process as claimed in claim 23, wherein more than 90% by number of the particles of the second particulate fraction have a length at least 25 times less than $L1_{50}$.

25. The process as claimed in claim 9, wherein the second particulate fraction consists, to more than 80% by volume, of alumina particles, and/or of zirconia particles, and/or of stabilized zirconia particles, and/or of alumina-zirconia particles.

26. The process as claimed in claim 9, wherein the second particulate fraction comprises glass particles and/or glass-ceramic particles, the total amount of glass particles and glass-ceramic particles being greater than 0.5% and less than 18%, as a percentage by volume on the basis of the set of the ceramic particles of the slip.

27. The process as claimed in claim 26, wherein the total amount of glass particles and glass-ceramic particles is greater than 1% and less than 5%, as a percentage by volume on the basis of the set of the ceramic particles of the slip.

28. The process as claimed in claim 9, wherein the glass particles are selected from the group consisting of glasses containing silica, glasses containing boron oxide, and mixtures thereof.

29. The process as claimed in claim 28, wherein the glass particles are selected from the group of glasses comprising, preferably consisting of to more than 90% by weight
$SiO_2$ on the one hand, and CaO and/or MgO and/or $Na_2O$ and/or $TiO_2$ and/or $K_2O$ and/or $Al_2O_3$ on the other hand, the silica content being greater than 10% by weight, or
$B_2O_3$ on the one hand, and CaO and/or $Na_2O$ and/or $TiO_2$ and/or $K_2O$ and/or $Al_2O_3$ on the other hand, the boron content being greater than 10% by weight.

30. The process as claimed in claim 29, wherein
the silica content is greater than 80% by weight or the boron content is greater than 80% by weight, and/or
the $SiO_2$/CaO molar ratio is between 2 and 4.

31. The process as claimed in claim 29, wherein the second particulate fraction consists of, to more than 80% by volume, alumina particles and/or zirconia particles and/or stabilized zirconia particles and/or alumina-zirconia particles and/or glass particles consisting of, to more than 90% by weight, $SiO_2$ on the one hand, and CaO and/or MgO and/or $Na_2O$ and/or $TiO_2$ and/or $K_2O$ and/or $Al_2O_3$ on the other hand.

32. The process as claimed in claim 26, wherein the ratio of the amount by volume of particles which are neither glass particles, nor glass-ceramic particles to the total amount of glass particles and glass-ceramic particles is greater than 0.5 and less than 4.

33. The process as claimed in claim 32, wherein said ratio is greater than 1 and less than 2.5.

34. The process as claimed in claim 26, wherein, in the second particulate fraction, the median length of the glass particles and/or of the glass-ceramic particles of the second particulate fraction $D_{50v}$ is at least 2 times less than the median length of the particles which are not glass particles.

35. The process as claimed in claim 34, wherein, in the second particulate fraction, the median length of the glass particles and/or of the glass-ceramic particles of the second particulate fraction $D_{50v}$ is at least 5 times less than the median length of the particles which are not glass particles.

36. The process as claimed in claim 26, wherein the median length $D_{50c}$ of the particles which are neither glass particles, nor glass-ceramic particles is greater than 0.5 times and less than 1.5 times the product of the percentage by volume of the second particulate fraction on the basis of the set of the ceramic particles of the slip and of the mean thickness of the particles of the first particulate fraction W1*.

37. The process as claimed in claim 9, wherein:
in step a):
the suspended particles represent more than 8% and less than 20% of the volume of the slip, and
the ceramic particles represent more than 95% of the volume of the suspended particles, and
the first and second particulate fractions together represent more than 99% of the set of the ceramic particles, as percentage by volume, and
the particle size distribution of the ceramic particles of the suspension is bimodal, the two main modes corresponding to the first and second particulate fractions, respectively, and
the first particulate fraction, or "platelet fraction", represents more than 94% of the set of the ceramic particles, as a percentage by volume, and
more than 99% by volume of the platelets of the first particulate fraction comprise more than 99% by weight of alumina, and
more than 95%, by volume, of the platelets of the first particulate fraction, have a length of less than 20 μm, and of greater than 4 μm, a width of less than 10 μm and of greater than 3 μm, and a thickness less than or equal to 1.5 μm, and
the second particulate fraction represents more than 3% and less than 6% of the ceramic particles, as a percentage by volume on the basis of the set of the ceramic particles, and
more than 95%, by number of the particles of the second particulate fraction, have a length at least 25 times less than $L1_{50}$, and the second particulate fraction comprises glass particles as a mixture with alumina particles, the ratio of the amount by volume of particles which are neither glass particles, nor glass-ceramic particles to the total amount by volume of glass particles and glass-ceramic particles is greater than 0.5 and less than 2.5, and the glass particles are selected from the group of glasses consisting of, to more than 90% by weight, $SiO_2$ on the one hand, and CaO and/or MgO on the other hand, and in step c), the freezing rate is greater than 10 μm/s and less than 100 μm/s, and step d) is a step of removing the ice crystals by sublimation thereof, and the steps h) and i) are carried out within a single step using an SPS process, carried out under vacuum, at a maximum temperature of between 1300° C. and 1700° C., and at a pressure of greater than 30 MPa.

38. A device selected from:
a turbine,
a sensor other than a displacement sensor,
a probe,
a membrane for the filtration of gases or liquids,
an armor or armoring element,
a shield or shielding element,
a wear-resistant part or coating,
an element of the infrastructure of a kiln,
a thick or thin layered substrate for electronic components and insulators for electrical conductors,
a tool,
a grinding wheel,
grains for debarring or treating a surface,
a shaping tool, in particular a die, an injection mold,
a support for firing ceramics,
a prosthesis, in particular a dental implant, an orthopedic element, said device comprising a product
having a relative density of greater than 90%,
comprising, to more than 80% of the volume thereof, a stack of ceramic platelets (10), a platelet having major faces that are substantially flat and parallel to one another, the ceramic platelets being stacked flat, so that said major faces of said platelets extend parallely to a general plane, the set of said platelets having a mean thickness of less than 3 μm,
having a width (l) of greater than 50 mm, and
comprising more than 20% of alumina, as a percentage on the basis of the weight of the product,
the width (l) of the product being the largest dimension measured in the plane (C) in which the length of the product is measured, along a direction perpendicular to the direction of said length,
the length (L) of said product being the largest dimension thereof in a plane (C) parallel to the general plane in which the platelets extend.

* * * * *